United States Patent
Vashchenko et al.

(10) Patent No.: US 11,015,120 B2
(45) Date of Patent: May 25, 2021

(54) LOW BIREFRINGENCE FERROELECTRIC LIQUID CRYSTAL MIXTURES

(71) Applicant: The Hong Kong University of Science and Technology, Hong Kong (CN)

(72) Inventors: Valerii Vladimirovich Vashchenko, Kharkov (UA); Evgenii Pavlovich Pozhidaev, Moscow (RU); Abhishek Kumar Srivastava, Lucknow (IN); Vladimir Grigorievich Chigrinov, Hong Kong (CN); Hoi Sing Kwok, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 61 days.

(21) Appl. No.: 15/884,102

(22) Filed: Jan. 30, 2018

(65) Prior Publication Data

US 2018/0216004 A1  Aug. 2, 2018

Related U.S. Application Data

(60) Provisional application No. 62/499,527, filed on Jan. 30, 2017.

(51) Int. Cl.
| | | |
|---|---|---|
| G02F 1/1333 | (2006.01) | |
| C09K 19/02 | (2006.01) | |
| C09K 19/30 | (2006.01) | |
| C09K 19/36 | (2006.01) | |
| C09K 19/58 | (2006.01) | |
| C09K 19/34 | (2006.01) | |
| C09K 19/04 | (2006.01) | |

(52) U.S. Cl.
CPC ...... *C09K 19/0225* (2013.01); *C09K 19/3068* (2013.01); *C09K 19/3458* (2013.01); *C09K 19/36* (2013.01); *C09K 19/586* (2013.01); *C09K 2019/0437* (2013.01); *C09K 2019/3075* (2013.01)

(58) Field of Classification Search
CPC ............ C09K 19/0225; C09K 19/3068; C09K 19/3458; C09K 19/36; C09K 19/586; C09K 2019/0437; C09K 2019/3075; G02F 1/1333
USPC .................................................. 252/299.61
See application file for complete search history.

(56) References Cited

U.S. PATENT DOCUMENTS

| 6,413,448 B1 | 7/2002 | Wand et al. |
|---|---|---|
| 2008/0083902 A1 | 4/2008 | Wittek et al. |
| 2018/0216004 A1* | 8/2018 | Vashchenko ....... C09K 19/0225 |

FOREIGN PATENT DOCUMENTS

| DE | 3807823 A1 | 9/1989 |
|---|---|---|
| DE | 10135680 A1 | 2/2002 |
| EP | 0315958 A2 | 5/1989 |
| EP | 0332007 A1 | 9/1989 |
| EP | 0399298 A2 | 11/1990 |
| JP | 2013-147592 A | 8/2013 |
| JP | 2014-019647 A | 2/2014 |
| JP | 2014-214137 A | 11/2014 |
| WO | WO-87/05015 A1 | 8/1987 |

OTHER PUBLICATIONS

Omenat, A., et al, Synthesis, Characterization, and Physical Properties of New Ferroelectric Liquid Crystalline Materials: Block Copolymers, Macromolecules, 1996, 29(21):6730-6736, American Chemical Society.
Petrov, V. F., et al, The trans-1,4-cyclohexylene group as a structural fragment in liquid crystals, Liquid Crystals, 1999, 26(8):1141-1162, Taylor & Francis Ltd.

* cited by examiner

*Primary Examiner* — Geraldina Visconti
(74) *Attorney, Agent, or Firm* — Saliwanchik, Lloyd & Eisenschenk

(57) ABSTRACT

A low birefringence ferroelectric liquid crystal (FLC) mixture composed of at least two components shows birefringence in the range 0.05 to 0.14, which is suitable for the modern display and photonic devices. The cell gap can be tuned from 1.5 μm to 4 μm to reduces the fabrication complexity and chromatic distortion by electro-optical modulation. The FLC mixtures can be employed in a wide temperature range. The characteristics of the said FLC mixture can be tuned by tuning the concentration of the constituents of the mixture. The helical pitch of the FLC mixtures can be varied from 100 nm to 10 μm. A smectic tilt angle can be varied between 17° to 45° and the spontaneous polarization can be tuned over a wide range to meet requirements of different electro-optical modes, and the FLC mixture is applicable for a wide variety of electro-optical effects.

19 Claims, 22 Drawing Sheets n-CHA-m

DCHA-3

LOW BIREFRINGENCE FERROELECTRIC LIQUID CRYSTAL MIXTURES

CROSS-REFERENCE TO RELATED APPLICATION

This application claims the benefit of U.S. Provisional Application Ser. No. 62/499,527, filed Jan. 30, 2017, which is herein incorporated by reference in its entirety.

BACKGROUND OF THE INVENTION

Ferroelectric liquid crystals (FLCs) materials, because of fast switching speed, low driving voltages, and high optical quality, are in high demand for various display and photonic applications. FLCs, because of spontaneous polarization, are known to have faster response time than nematic liquid crystals. However, they suffer through the low optical contrast due to the occurrence of geometrical defects. Recently FLC electro-optical modes have been developed that provide sufficiently good optical quality. Most of these known electro-optical effects in FLCs work on the principle of retardation introduced by the half-wave-plate mode, which can be defined by equation (1):

$$d = \lambda/2\Delta n \quad (1)$$

and where $$\Delta n = n_\| - n_\perp \quad (2)$$

where the FLC cell thickness (d) at a given wavelength ($\lambda$) is inversely proportion to the FLC birefringence ($\Delta n$). Most commercially available FLC materials possess $\Delta n$ in the range of 0.14-0.18 at $\lambda$=0.54 µm and, therefore, require a cell gap of 1.5 to 2 µm to achieve acceptable conditions of the half wave plate, at least for the maximum spectral sensitivity of the human eye at $\lambda$=0.54 µm. It is extremely difficult to maintain a high fabrication yield for such a small cell gap. The lowest appropriate thickness is around 3-3.5 µm, that, according to eq. (1), required $\Delta n$ values at $\lambda$=0.54 µm in a range of 0.077-0.09.

Recently, an electro-optical effect for the FLCs has been disclosed, where the helical pitch is comparable to the FLC layer thickness and the anchoring energy of the commanding surfaces balances the elastic energy of the FLC helix. This electro-optical effect called an Electrically Suppressed Helix FLC (ESHFLC) mode displays high optical contrast that is comparable to nematic LC.

A strategic way to reduce the $\Delta n$ of FLCs is by use of a mixture of low birefringence compounds. The total $\Delta n$ of such FLC mixtures, for low $\Delta n$ materials, can be written as:

$$\Delta n = \Sigma x_i \Delta n_i \quad (3)$$

where $x_i$ is the molar fraction and $\Delta n_i$ represents the birefringence of the $i^{th}$ component provided that the $\Delta n_i$ are related to the same reduced temperature below, which is proportional to the molar impact of each component. Formula (3) is generally correct only for low $\Delta n_i$ values.

The birefringence of the organic material strongly correlates with molecular polarizability, mainly depending on the lengthening of molecular conjugation of $\pi$-electron systems. Therefore, strategies to reduce $\Delta n$ include inclusion of saturated units in the core of LC molecules, such as exchange of aromatic rings with cyclohexane or cyclohexene and breaking of the conjugation by means of aliphatic spacers.

FLC materials are typically a mixture of several of compounds, often 4, 5, or more, with the components of the mixture being divided into several groups depending on their specific role. The major part of FLC mixture is the compound showing smectic-C liquid crystal phase, providing a range of basic characteristics, such as a temperature interval of the ferroelectric phase, viscosity, dielectric and optical properties. Another important component of the FLC mixture can be represented by compounds that are non-mesogenic, often being chiral components of FLCs, or exhibit liquid crystal phases other than SmC types. Although in a few cases such non-SmC and non-mesogenic compounds can enhance the SmC range of the FLC mixture, although typically these components suppress the desired phase, and their content is typically minimized to avoid diminishing the working temperature interval of FLC materials. The degree of $\Delta n$ adjustment by minor components of FLC is naturally very small.

The effective Birefringence depends on the type of electro-optical effect in a FLC. Birefringence ($\Delta n$) is determined by equation (2) only in a low-twisted FLC, where helical pitch (p) is comparable or higher than cell gap, as disclosed in Srivastava et al., *J. Soc. Inform. Display* 2015, 23(6) 253-72. For highly-twisted FLC (DHF, Kerr effect), where p<< than the cell gap, the effective birefringence ($\Delta n_{eff}$) depends on the smectic tilt angle and can be described as:

$$\Delta n_{eff} = n_\| n_\perp / [n_\perp^2 + (n_\|^2 - n_\perp^2)\sin^2\theta \sin^2\varphi]^{1/2} - n_\perp \quad (4)$$

The typical value of the tilt angle for DHF effect is in the range of 0~32-37°, and therefore, the effective $\Delta n$ in the cell is about two times lower, than the estimations from eq. 1 valid for the SSFLC effect. Thus, required $\Delta n$ values at $\lambda$=0.54 µm calculated by eq. 1, in the case of DHFLC can be in the range of 0.15-0.18. However, currently available DHFLC materials based mainly on three-ring aromatic (or heteroaromatic) compounds, thereby possessing $\Delta n$ values of 0.2 or more.

In liquid crystal materials with considerably slower optical switching, such as nematic LCs or block-polymer smectic-C, low $\Delta n$ values are well-known. However, non-polymeric low $\Delta n$ FLCs are still a big challenge. To date, the vast majority of known SmC liquid crystals possess $\Delta n$ of about 0.14 or higher. Using LiqCryst 5.1 and its database only 1,506 of the 14,260 SmC compounds were found to contain at least one aliphatic ring and only one compound comprises exclusively aliphatic units. This sole example is

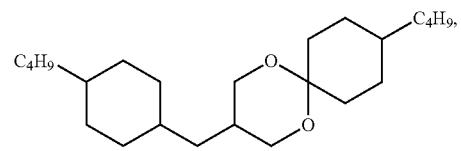

as disclosed in Frach et al. *Liquid Crystals* 1989, 5(1), 197-207 where a more ordered modification of SmC, namely SmE phase, which has little practically applicability due to its very high viscosity. A second example, when SmC phase was found for fully aliphatic compounds is disclosed in Das et al. *Chem. Phys. Let.* 2005, 410 417-22 for a mixture of two steroids the SmC* phase is induced, however, its small range of concentrations and narrow temperature range leave this mixture unsuited for practical applications. Cholesterol esters are weak chiral dopant to FLC materials in respect of spontaneous polarization induction.

Based on the analysis of the literature, the most widespread classes of LC cores can be ranked accordingly to their conjugation length within molecules allowing the generalization of the effect of conjugation length on Δn as shown in FIG. 1.

BRIEF SUMMARY OF THE INVENTION

Embodiments of the invention are directed to low birefringence ferroelectric liquid crystal (FLC) mixtures, which have a plurality of components and show birefringence in the range 0.05 to 0.14, which are suitable for the modern displays and photonic devices. Because of low birefringence, the cell gap, which corresponds to half waveplate retardation of the display cell for the FLCs, can be tuned from 1.5 μm to 4 μm to reduce the fabrication complexity and chromatic distortion of electro-optical modulation. The FLC mixtures possess a wide temperature range. The characteristic of the FLC mixture can be tuned by the concentration of different constituents of the mixture. The helical pitch of the FLC mixtures, depend on the chemical structure of the chiral components and its concentration can be varied from 100 nm to 10 μm. Depending on composition of the low birefringence FLC, the smectic tilt angle can be varied between 17° to 45° and the spontaneous polarization can be tuned in a wide range to meet requirements for different electro-optical modes. With this flexible component choice giving different material characteristics, the FLC is applicable for a wide variety of electro-optical effects.

DETAILED DESCRIPTION OF THE INVENTION

Figure 1:
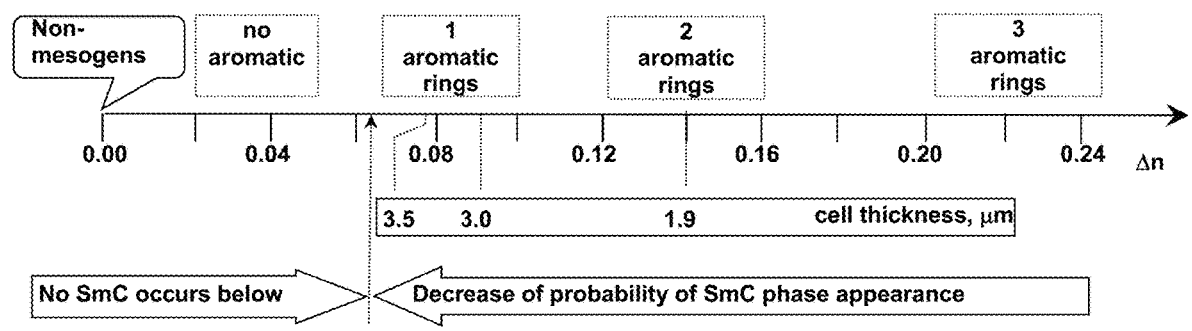
FIG. 1 shows a schematic diagram for the relationship between the amount of conjugated aromatic rings in LC core molecular structure, the resulting birefringence, and the probability of SmC phase formation, where the required cell thickness according to eq. 1 are useful as a guide at λ=550 nm.
Figure 2:
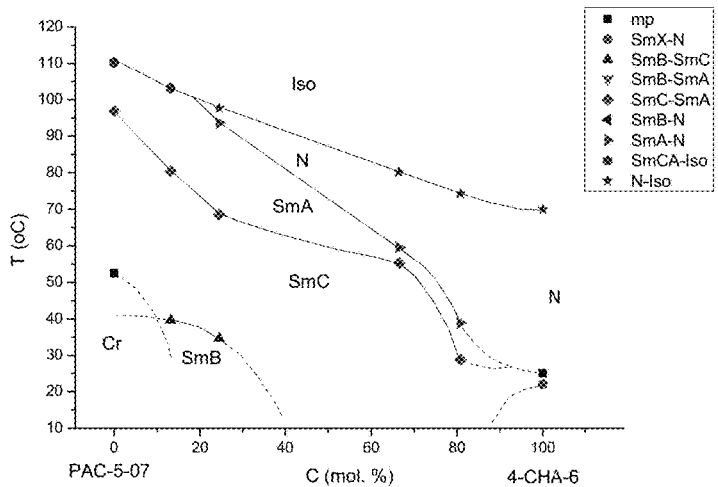
FIG. 2 shows phase diagrams for 2-(4-(heptyloxy)phenyl)-2-oxoethyl 4-pentylcyclohexanecarboxylate (PAC-5-O7) with nematic 4-hexyloxyphenyl-4-buthylcyclohexyl carboxylate (4-CHA-6), according to an embodiment of the invention.
Figure 3:
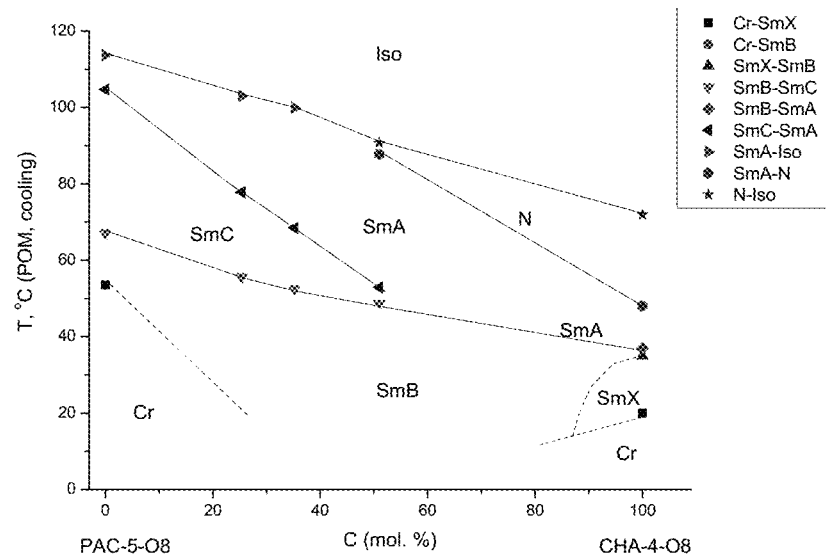
FIG. 3 shows phase diagrams for 2-(4-(octyloxy)phenyl)-2-oxoethyl 4-pentylcyclohexanecarboxylate (PAC-5-O8) with 4-octyloxyphenyl-4-buthylcyclohexyl carboxylate (4-CHA-O8) according to an embodiment of the invention.
Figure 4:
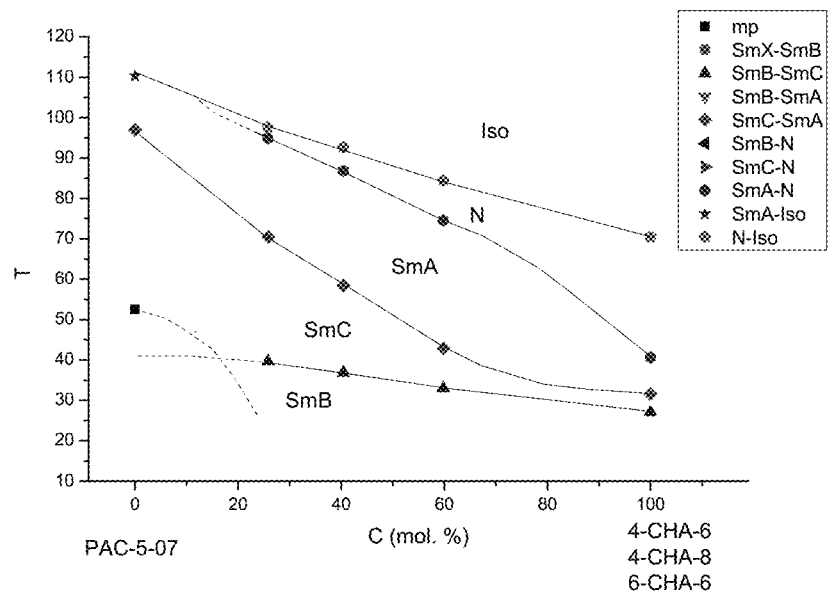
FIG. 4 shows phase diagrams for 2-(4-(heptyloxy)phenyl)-2-oxoethyl 4-pentylcyclohexanecarboxylate (PAC-5-O7) with a mixture of 4-alkoxyphenyl-4-alkylcyclohexyl carboxylate according to an embodiment of the invention.
Figure 5:
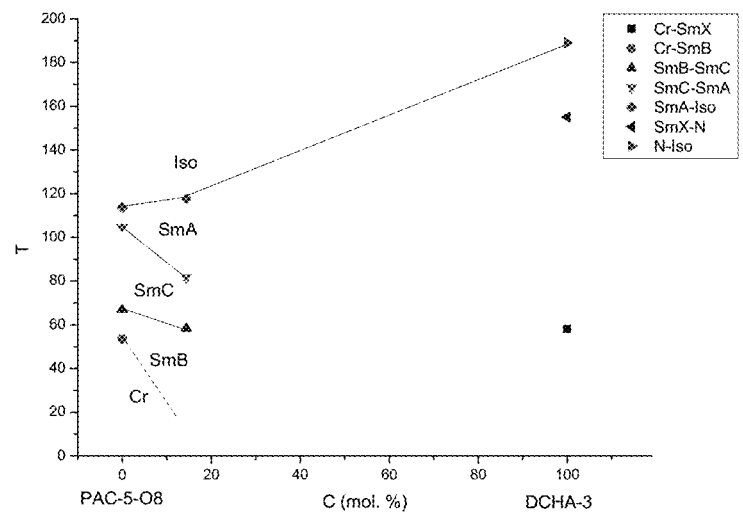
FIG. 5 shows fragments of phase diagrams for 2-(4-(octyloxy)phenyl)-2-oxoethyl 4-pentylcyclohexanecarboxylate (PAC-5-O8) with 4'-propyl-[1,1'-bi(cyclohexan)]-4-yl 4-propylcyclohexanecarboxylate (DCHA-3), according to an embodiment of the invention.
Figure 6:
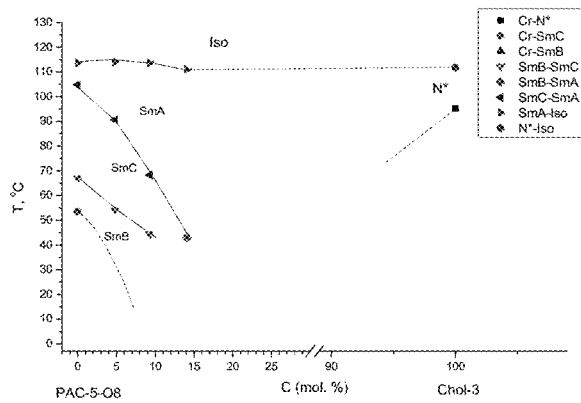
FIG. 6 shows fragments of phase diagrams for phase diagrams of the 2-(4-(octyloxy)phenyl)-2-oxoethyl 4-pentylcyclohexanecarboxylate (PAC-5-O8) with lower birefringence compounds—propanoylcholesterol (Chol3), according to an embodiment of the invention.

Embodiments of the present invention are directed to low birefringence ferroelectric liquid crystals (FLC's) where the birefringence can be adjusted in the range of 0.05-0.014 by controlling the constituents of the material. The FLCs are composed of a plurality of components, where a first component is a thermotropic liquid crystal and a second component is a low birefringence material, such as, but not limited to, a smectic-C material. The low Δn FLC mixtures eliminates conjugated aromatic molecules comprising two or more than two aromatic or heteroaromatic rings and avoiding extended conjugation with more than one π-bonds, such as, but not limited to, C=C, C=O, or an ester group. In an embodiment, the chiral fragments of components for the FLC mixtures possess different types of compounds in one or both of the oligomers termini or wings, W1 and/or W2, and the FLC has liquid crystals phases. In an embodiment of the invention the FLC mixture displays a smectic-C phase.

In embodiments of the invention, the low birefringence ferroelectric liquid crystal mixture that shows birefringence (Δn) in the range 0.05 to 0.14 comprises a plurality of components, a first component being a thermotropic liquid crystal, possibly a smectic-C phase, while a second component being a low birefringence material with Δn of 0.02 to 0.1, where either can be a thermotropic liquid crystal, where the low birefringence ferroelectric liquid crystal has the formula:

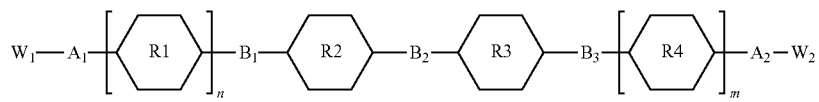

where:

n and m are independently 0, 1 or 2;

R1, R2, R3 and R4 are absent or are aromatic, heteroaromatic, 1,4-cyclohexylidene, 1,4-cyclohexenylidene, 1,3-dioxolane ring or a chiral or achiral polycyclic aliphatic fragment that can be substituted with one or more halogen atoms. Two or more these rings can be condensed with one another, and where one or more H atoms can independently be replaced with F atoms, the H atoms can be in lateral positions;

A1, A2 are single bond, O, S or ester functional group;

B1, B2 and B3 are absent or independently a single C—C bond, an ester group, or —C(O)CH$_2$COO—, —CX$_2$CH$_2$COO— where X is independently H or halogen atoms, (CH$_2$)$_m$, or (OCH$_2$)$_m$ where m is 2-11;

W1 and W2 are independently n-alkyl, chiral or achiral alkenyl, or chiral or achiral branched alkyl groups, where at least one CH$_2$ group is, independently, replaced by CF$_2$, O, and CH=CH groups provided that O atoms are not directly linked to one another.

In embodiments of the invention, the low-birefringence components of the ferroelectric liquid crystal mixture aromatic or heteroaromatic rings where R1-R4 are not conjugated or cross-conjugated with one another. The low birefringence components of the ferroelectric liquid crystal mixture has aromatic or heteroaromatic ring (R1-R4), independently, in conjugation with no more than one double bond of type C=Z, where Z is one of C, N or chalcogen.

In an embodiment of the invention, the first components of the low birefringence FLC mixture are of smectic-C or SmC* types liquid crystals. Other non-SmC mesogenic components, such as, but not limited to, nematic, cholesteric, SmA, and SmB, can be included to adjust phase transition temperatures or the total Δn of the mixture, as shown in FIGS. 2-11, whereas their ability to induce ferroelectric properties is indicated in Examples 1-8, below. The content of such non-Smectic-C components for any low birefringence FLC mixture depends on the target application, as indicated in the Examples, below. The mixtures preferably comprises several types of organic compounds, each of them plays a specific role(s) in the target FLC mixture, as indicated in Table 1.

TABLE 1

General Types of Compounds in Low Birefringence FLC Mixtures

| Chemical structures(s)* | Name of chemical type | Abbreviation | Role in mixture |
|---|---|---|---|
| 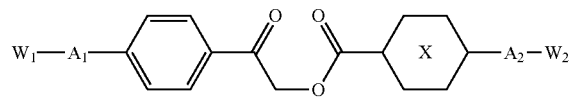 | Phenacylic esters 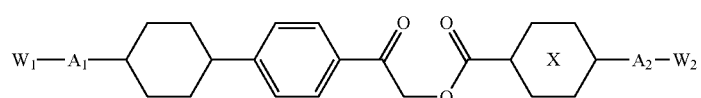 X is 1,4-disubstituted cyclohexane- or benzene ring | PAC | SmC Host |
| 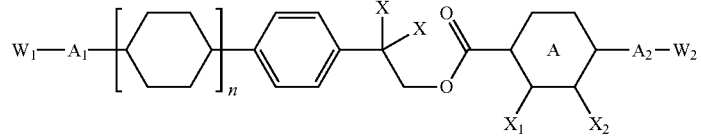 | Phenacylic esters 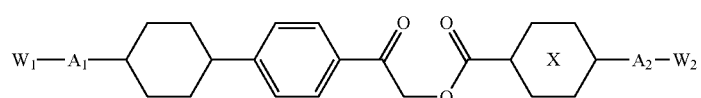 X is 1,4-disubstituted cyclohexane- or benzene ring | PAC-PC | SmC Host |
| 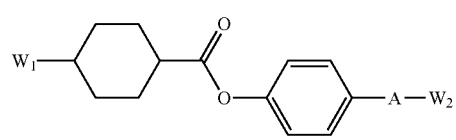 | Cyclohexylphenylethyl esters, X$_1$ = H or F 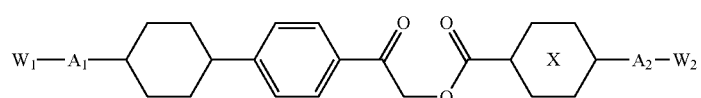 A is 1,4-disubstituted cyclohexane-, or benzene, or 2-fluorobenzene, or 3-fluorobenzene, or 2,3-difluorobenzene ring | CPEH (X = H) CPEF (X = F) | Δn and mp reducer |
| 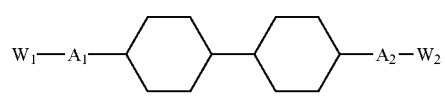 | Demus' esters (n = 0) | n-CHA-m | Δn and mp reducer |
| 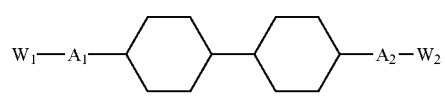 | Bicyclohexane derivatives, | BC | Δn and mp reducer |

TABLE 1-continued

General Types of Compounds in Low Birefringence FLC Mixtures

| Chemical structures(s)* | Name of chemical type | Abbreviation | Role in mixture |
|---|---|---|---|
| W₁—A₁—[cyclohexane]—[cyclohexane]—C(O)O—[phenyl]—A—W₂ | Phenylcyclohexane carboxylic acid esters | PCH | Δn and mp reducer |
| W₁—A₁—[cyclohexane]—[cyclohexane]—C(O)O—[cyclohexane]—A—W₂ | Bicyclohexyl carboxylic acid esters | DCHA | Δn and mp reducer |
| W₁—A₁—[cholesterol] | Cholesterol derivatives, A₁ is preferably —COO— ester group | Chol-n | Δn and mp reducer |
| W₁—[cyclohexane]—A₁—[cholesterol] | Cholesterol derivatives, A₁ is preferably —COO— ester group | Chol-CHA-n | Δn and mp reducer |
| W₁—A₁—[pyrimidine]—[phenyl]—[R3]$_k$—A₂—W₂ | Phenylpyrimidine derivatives, k = 0, 1; R3 is 1,4-phenylene- or cyclohxylene ring | PP | SmC stabilizer, mp reducer |
| W₁—A₁—[phenyl]—[cyclohexane]—[phenyl]—A₂—W₂ | 1,4-diphenylcyclohexane derivatives, preferably A1 = A2 = COO bridge group, W₁ and/or W₂ is chiral | PCP | Chiral dopant |
| W₁—A₁—[phenyl]—[phenyl]—[phenyl]—A₂—W₂ | 4,4"-terphenyl derivatives, preferably A1 = A2 = COO bridge group, W₁ and/or W₂ is chiral | TDA | Chiral dopant |

*)W₁ and W₂ are alkyl; A₁, A₂ are single C—C bond or oxygen atom

Preparation of PAC and PAC-PC type liquid crystals can be carried out as in reaction scheme 1.

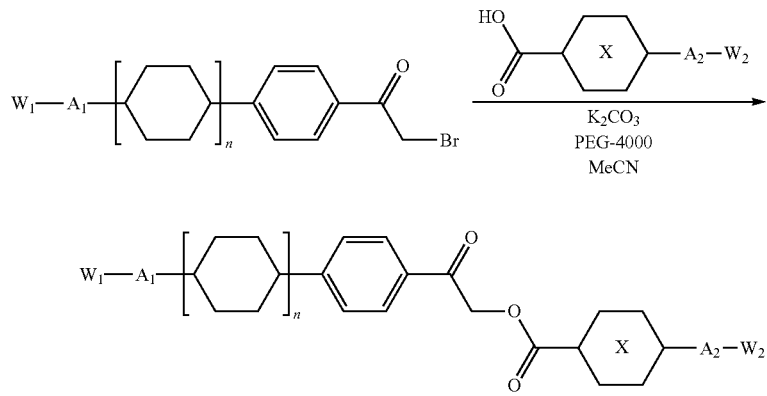

Scheme 1

Preparation of CPEH ($X_1$=H) and CPEF ($X_1$=F) type liquid crystals can be carried out as in reaction scheme 2.
Scheme 2
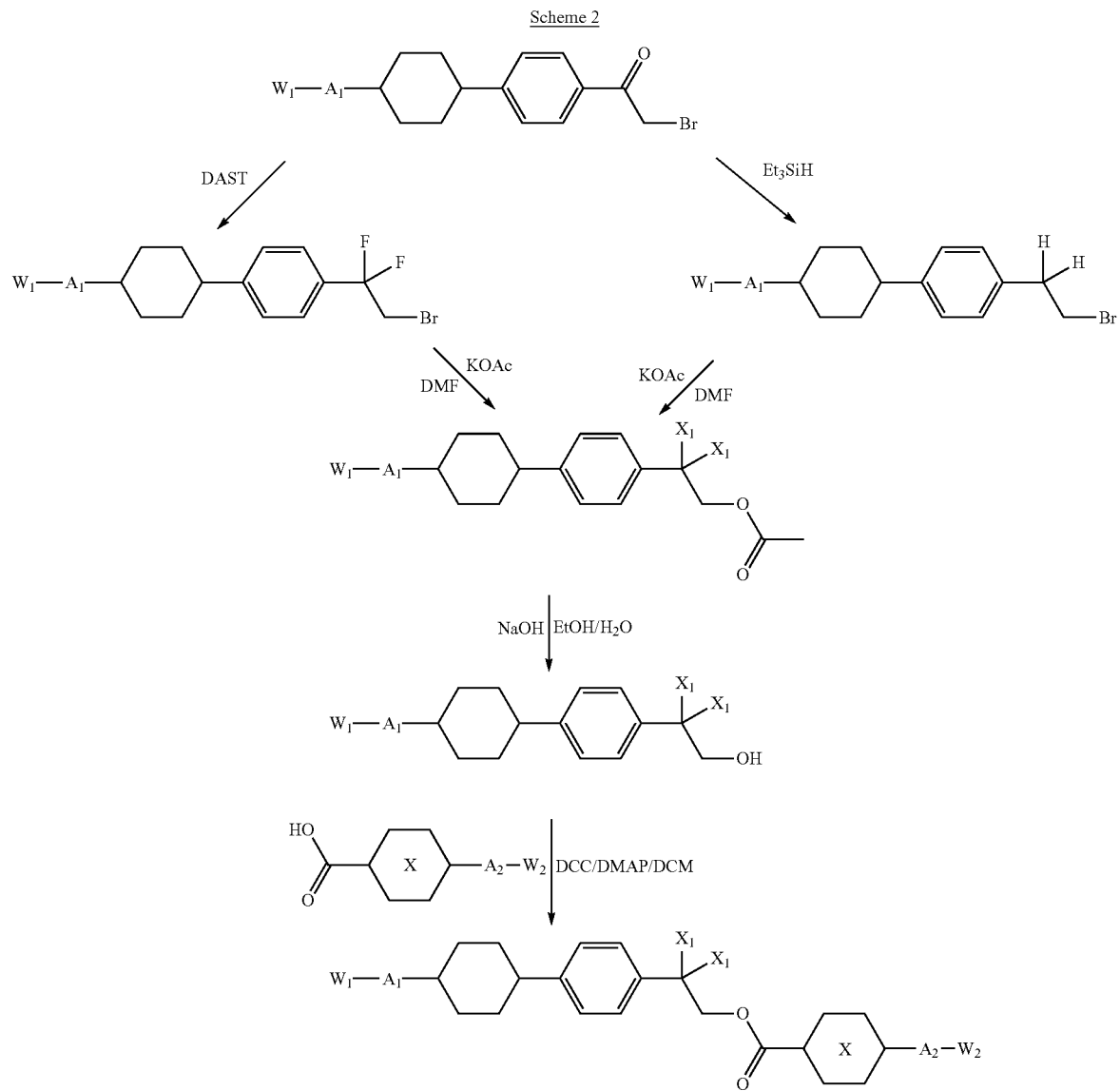
Preparation of PCP type liquid crystals can be carried out as in reaction scheme 3.
Scheme 3
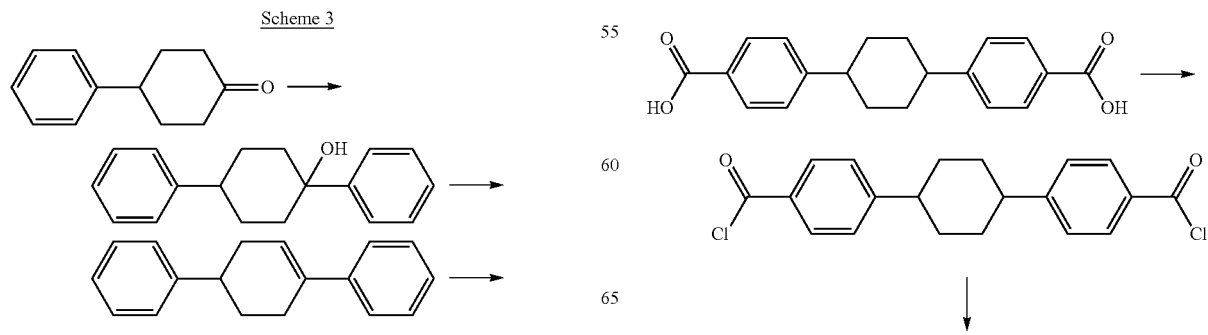

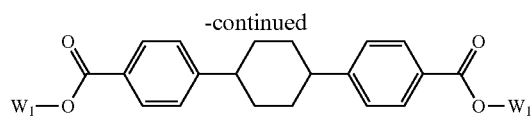

Phenacylic esters of cyclohexancarboxylic acids (PAC) were firstly disclosed in Petrov et al. *Liquid Crystals*, 1999, 26(8), 1141-62, however, the mesomorphic properties did not achieve optimal values of parameters needed for various electro-optical modes, having a SmC phase transition that starts above 100° C. PAC and PAC-PC comprising LC materials, according to an embodiment of the invention, possess a wide range for phase transition of the of SmC phase starting from about 60 to 70° C., rather than the high upper temperature limit of typical SmC phases for PAC and PAC-PC compounds, that occurs above 100° C., as indicated in Table 2 and 3, below. Consistent with the chemical formula of the PAC compounds, the Δn is around 0.1. In this embodiment of the invention, a large SmC temperature phase transition range and low Δn occurs. The addition of a chiral component to the body of the PAC allows a chiral mesogens capable of inducing a desirable value of spontaneous polarization, see, for example, entries 1, 2, 4-7, 9-12 in

TABLE 2

The PAC compounds are core for low birefringence FLC mixtures.
Table 2 Phase transitions[a] of the PACs of general formula

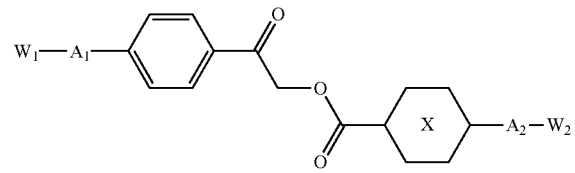

| Entry | W1 | $A_1$ | $X^b$ | W2 | Cr | ° C. | SmX | ° C. | SmB | ° C. | SmC | ° C. | SmA | ° C. | N | ° C. | Iso |
|---|---|---|---|---|---|---|---|---|---|---|---|---|---|---|---|---|---|
| 1 | $C_6H_{13}$ | O | C | $C_5H_{11}$ | • | 55.8 | | | | | • | 83.5 | • | 105.2 | • | 108 | • |
| 2 | $C_7H_{15}$ | O | C | $C_5H_{11}$ | • | 52.5 | | | | | • | 96.9 | • | 110.3 | | | • |
| 3 | $C_8H_{17}$ | — | C | $C_5H_{11}$ | • | 88.7 | | | • | (86.4) | | | • | 95.6 | | | • |
| 4 | $C_8H_{17}$ | O | C | $C_4H_9$ | • | 56 | | | • | 65.2 | • | 99.3 | • | 110.7 | | | • |
| 5 | $C_8H_{17}$ | O | C | $C_5H_{11}$ | • | | | | • | 67 | • | 104.7 | • | 113.7 | | | • |
| 6 | $C_8H_{17}$ | O | C | $C_6H_{13}$ | • | 51 | | | • | 65.4 | • | 101 | • | 113.4 | | | • |
| 7 | $C_8H_{17}$ | O | C | $C_6H_{13}$ | • | 50.1 | • | | | 60.5 | • | 103.3 | • | 114.0 | | | • |
| 8 | $C_8H_{17}$ | O | B | $C_6H_{13}$ | • | 63.8 | | | | | • | 82.5 | • | 87.5 | • | 94.5 | • |
| 9 | $C_8H_{17}$ | O | B | $C_5H_{17}$ | • | 70.8 | | | | | • | 86.3 | • | 89.85 | • | 95.5 | • |
| 10 | (R)CH(CF$_3$)C$_6$H$_{13}$ | O | C | $C_5H_{11}$ | • | 37 | • | 42 | | | | | | | | | • |
| 11 | (S)CH$_2$CHFC$_6$H$_{13}$ | O | C | $C_5H_{11}$ | • | 71.5 | | | | | • | 93.5 | • | 117.9 | | | • |
| 12 | $C_{10}H_{21}$ | O | C | $C_4H_9$ | • | 60 | | | • | 76.9 | • | 104 | • | 113.8 | | | • |
| 13 | $C_{10}H_{21}$ | O | C | $C_5H_{11}$ | • | 50 | • | 52 | • | 83.2 | • | 110.3 | • | 116.4 | | | • |
| 14 | $C_{10}H_{21}$ | O | C | $C_6H_{13}$ | • | 87.5 | | | • | 85.2 | • | 112.2 | • | 117.2 | | | • |

[a]All phase transitions are obtained in the current invention except Entries 7-9, from Petrov et al.;
[b]C - is 1,4-trans-disubstituted cyclohexane ring; B is 1,4-disubstituted benzene ring; A$_2$ is a single bond.

TABLE 3

Phase transitions[a] of the PAC-PCs of general formula

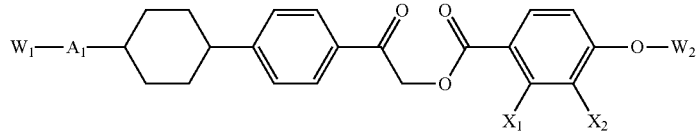

| Entry | $W_1$ | $X_1$ | $X_2$ | $R_1$ | Cr | ° C. | SmX | SmC | ° C. | SmA | ° C. | N | ° C. | Iso |
|---|---|---|---|---|---|---|---|---|---|---|---|---|---|---|
| 1. | $C_3H_7$ | F | H | $C_8H_{17}$ | • | 68.1 | | • | 119.3 | • | 160 | • | 173.3 | • |
| 2. | $C_3H_7$ | F | F | $C_8H_{17}$ | • | 65 | | • | 114.0 | | | • | 163.8 | • |
| 3. | $C_4H_9$ | F | F | $C_8H_{17}$ | • | 57.3 | | • | 128.6 | | | • | 161.9 | • |
| 4. | $C_5H_{11}$ | F | H | $C_8H_{17}$ | • | 57.5 | | • | 117.8 | • | | | | • |
| 5. | $C_5H_{11}$ | H | F | $C_8H_{17}$ | • | 70.0 | | • | 100.4 | | | • | 165.2 | • |
| 6. | $C_5H_{11}$ | F | F | $C_8H_{17}$ | • | 58 | | • | 144.5 | • | 169 | | | • |
| 7. | $C_5H_{11}$ | F | H | (S)-CH$_2$C*HFC$_6$H$_{13}$ | • | 66.5 | | • | 84.4 | | | • | 168.0 | • |
| 8. | $C_5H_{11}$ | F | F | $C_{10}H_{21}$ | • | 68.8 | | • | 147.4 | • | 163.9 | | | • |

Figure 7:
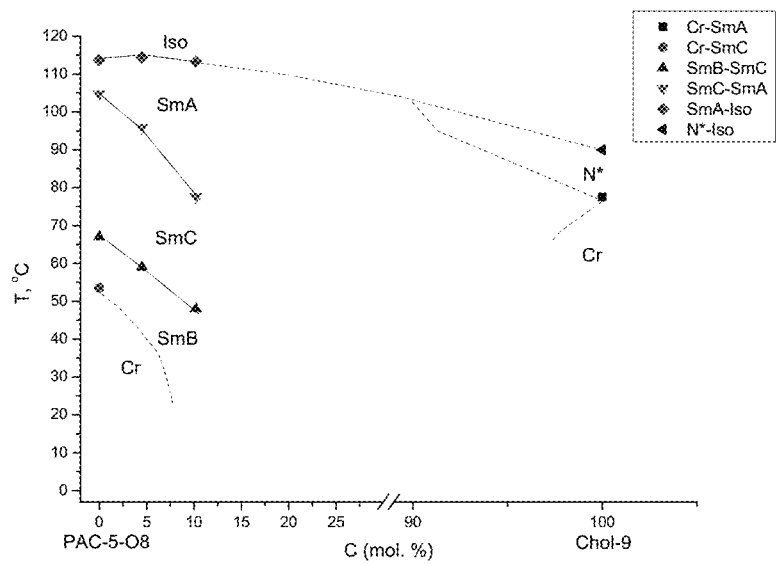
FIG. 7 shows fragments of phase diagrams for 2-(4-(octyloxy)phenyl)-2-oxoethyl 4-pentylcyclohexanecarboxylate (PAC-5-O8) with lower birefringence compounds—nonanoylcholesterol (Chol9), according to an embodiment of the invention.
Figure 8:
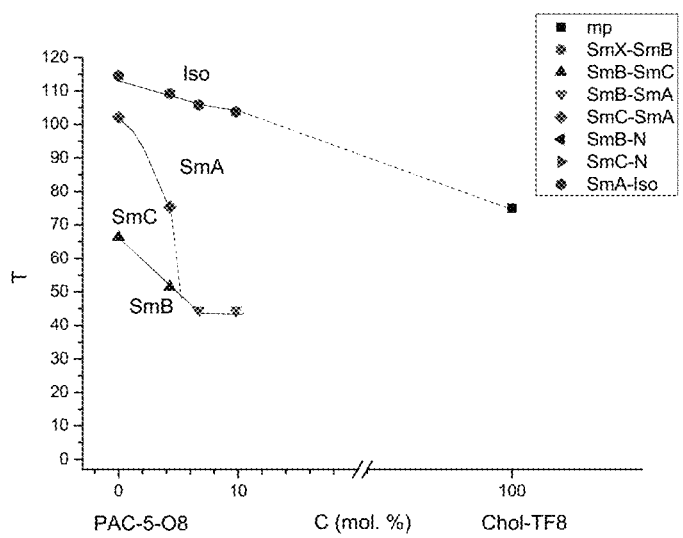
FIG. 8 shows fragments of phase diagrams for 2-(4-(octyloxy)phenyl)-2-oxoethyl 4-pentylcyclohexanecarboxylate (PAC-5-O8) with lower birefringence compounds—3-((2-trifluoromethyl)-heptyl)-cholesterol (Chol-TF8), according to an embodiment of the invention.
Figure 9:
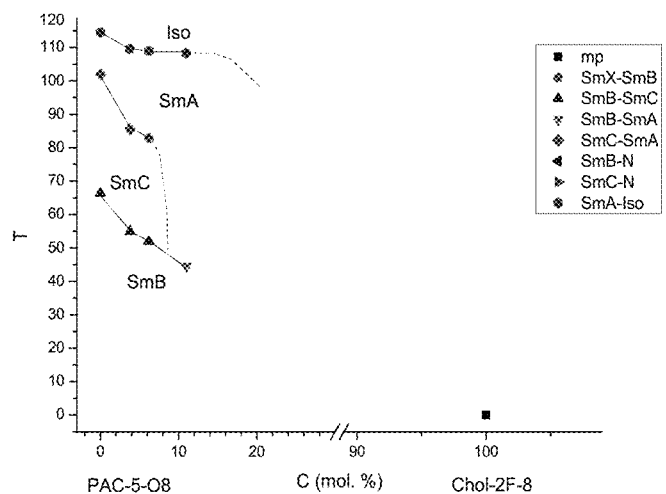
FIG. 9 shows fragments of phase diagrams for 2-(4-(octyloxy)phenyl)-2-oxoethyl 4-pentylcyclohexanecarboxylate (PAC-5-O8) with lower birefringence compounds—3-(2-fluorooctyl)-cholesterol (Chol-2F-8), according to an embodiment of the invention.
Figure 12:
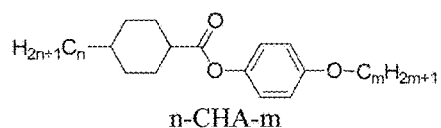
FIG. 12 shows structures of exemplary compounds that can reduce Δn in the mixtures with compounds of PAC type esters, according to an embodiment of the invention.
Figure 12:
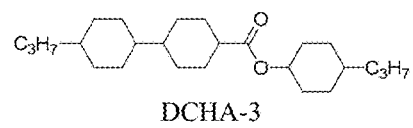
Figure 13:
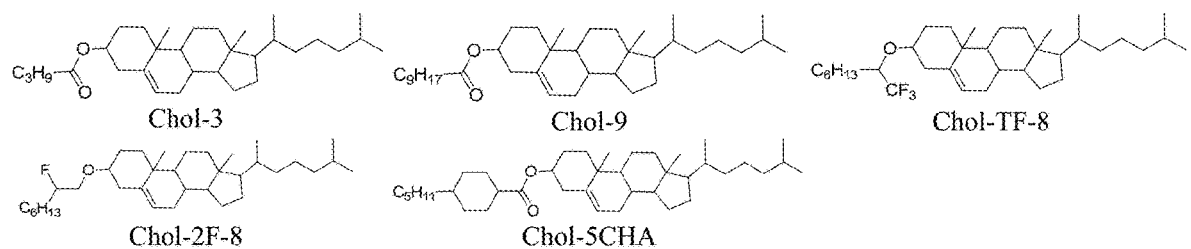
FIG. 13 shows structures of various cholesterol derivatives that can reduce Δn in mixtures with compounds of PAC type, according to an embodiment of the invention.

The PAC series has an orthogonal SmB or another high-ordered phase below SmC (see Table 2). FIG. 7 shows that temperatures of SmB-SmC phase transitions are almost linearly dependent on the individual components, retaining the temperature range of undesirable SmB phase. An additional smectic phase below SmC, in both components, impose certain restrictions on SmC phase temperature range by means of finding an eutectic mixture, as is illustrated in FIGS. 4-9. An almost linear dependence of SmB phase transition temperature on the components concentration is observed. Additionally, the birefringence values of about 0.1 for PAC type compounds requires a thin cell gap of 2.7-2.8 µm to achieve the half wave retardation for the green light, and, therefore, Δn should be further reduced. Therefore, in this embodiment of the invention, components with low Δn are needed to suppress the Δn. The following type of compounds can be included as Δn reducers: (i) esters of 4-alkylcyclohexanecarboxylic acids, as shown in FIG. 12, for their phase diagram see FIGS. 2-5 and (ii) cholesterol derivatives, whose chemical structures are given in FIG. 13, for the phase diagrams see FIG. 6-10.

Figure 10:
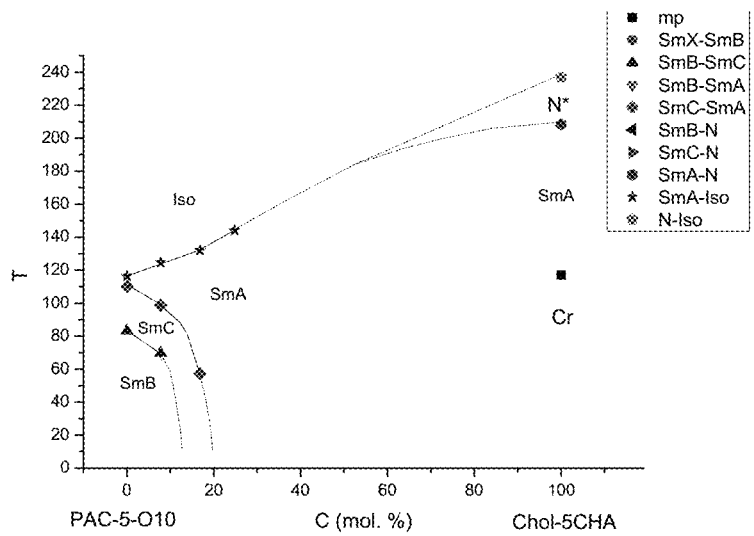
FIG. 10 shows fragments of phase diagrams for 2-(4-(decyloxy)phenyl)-2-oxoethyl 4-pentylcyclohexanecarboxylate (PAC-5-O10) with lower birefringence compounds—3-(4-pentylcyclohexylcarbonyl)-cholesterol (Chol-TF8), according to an embodiment of the invention.
Figure 14:
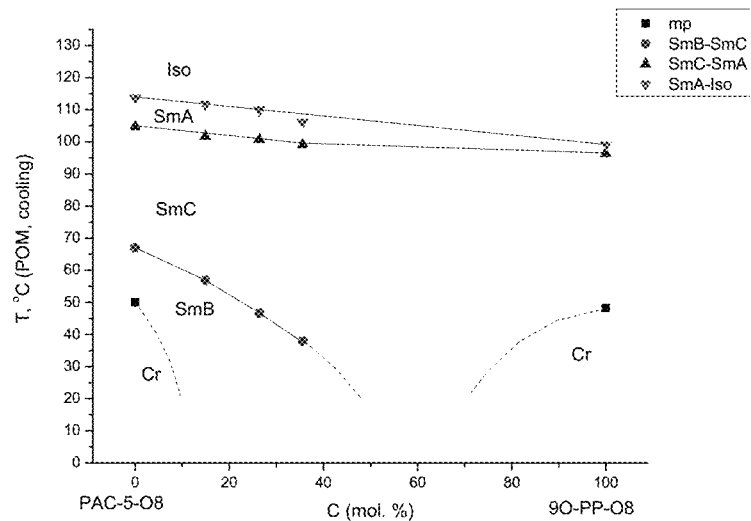
FIG. 14 shows phase diagrams of 2-(4-(octyloxy)phenyl)-2-oxoethyl 4-pentylcyclohexanecarboxylate (PAC-5-O8) with 2-(4octyloxyphenyl)-5-nonyloxypyrimidine (9O-PP-O8), according to an embodiment of the invention.

Compounds with low Δn, other than PAC, reveals some degree of an adverse effect regarding SmC phase. In some cases, the SmC phase becomes inferior to a SmB phase and shows further depression with higher concentrations of dopant with lower birefringence, for example, derivatives of cholesterol and cyclohexyl-bicyclohexyl carboxylate. Working mixtures cannot have a total unsaturated dopant content in excess of 10-12 mol. % for compounds DCHA-3 and Chol-5CHA and no more 5 mol. % for Chol-9. Among other dopants, phenylcyclohexane carboxylates (PCH), so-called Demus' esters, appeared to be superior. In another embodiment of the invention, a short SmC phase is mixed with PCH materials, where mixtures of PAC with nematic PCHs are well suited, for example those of FIGS. 2 and 4. Among the cholesterol derivatives, FIG. 5-10, the pentylcyclohexyl carboxylic esters (Chol-5CHA) were found to affect the compounds possessing the SmC* phase, as indicated in FIG. 10. This dopant can be used as a Δn reducer for FLC mixtures in concentration up to 10-15 mol. % with an acceptable reduction in the upper-temperature limit of SmC*. Two ring phenylpyrimidines (9O-PP-O8) were found to be effective SmB suppressor, as shown in FIG. 14.

The trend for SmC-SmA transitions is roughly that of the corresponding phase transitions of individual components, and remains sufficiently high within the entire range of concentrations. However, because of rather a high birefringence of phenylpyrimidines, about 0.14, its content should not exceed 40 mol. %, and is preferably below 20 mol. % to have appropriate Δn values for working mixtures.

Most electro-optical effects for ferroelectric liquid crystals have different requirement for $p_0$ and $\theta_C$, as summarized in Table 4, below. These effects can be controlled by the concentration of chiral components or dopants. Furthermore, dopants having a large transverse dipole directly attached to a chiral center provide sufficiently large pitches. To this end, many compounds according to embodiments of the invention, include, but not limited to, polar units like C*—F, C*—CF$_3$, C*—O—C, where C* denotes asymmetric, chiral carbon atom. In an embodiment of the invention, cholesterol derivatives that do not possess C*—F, C*—CF$_3$ fragments, do not induce any significant spontaneous polarization or small helical pitch to the FLC mixture when these compounds are used as Δn reducers in the current invention.

TABLE 4

Pitch ($p_0$) and tilt angle ($\theta_C$) for ferroelectric liquid crystals of different modes.

| Properties | Surface stabilized ferroelectric liquid crystal (SSFLC) | Deformed helix ferroelectric liquid crystals (DHFLC) | Electrically suppressed helix ferroelectric liquid crystals (ESHFLC) |
|---|---|---|---|
| Tilt angle (°) | 22.5 | 45 | 22.5 |
| Pitch (nm) | >3000-4000 nm much larger than the cell gap | <λ (wavelength of the visible light) much smaller than the cell gap | Comparable to the cell gap |

For helix formation, lower values of HTP are typical for mono-substituted dopants that contain a single chiral fragment at one of the terminal positions of dopant molecule. With respect to the chemical structure of the chiral fragment, according to an embodiment of the invention, structures can be ranked in the sequence C*—F<C*—O—C<C*—CF$_3$.

Figure 11:
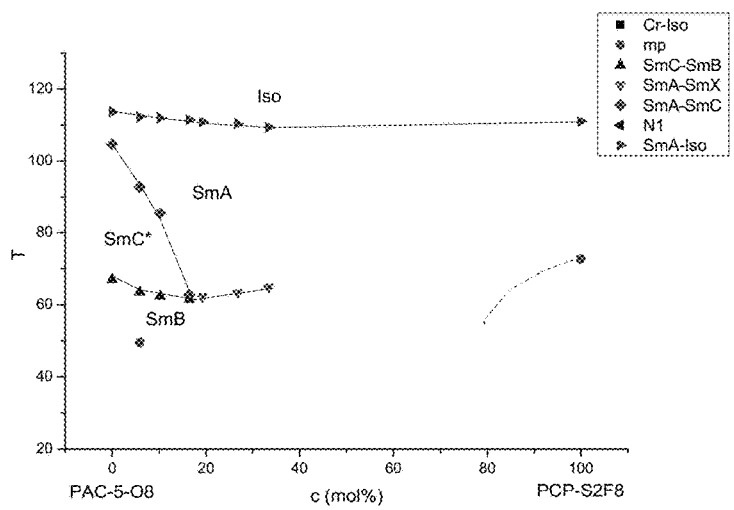
FIG. 11 shows phase diagrams that illustrate the effect of chiral compounds on phase transitions of FLC materials, according to an embodiment of the invention.
Figure 15:
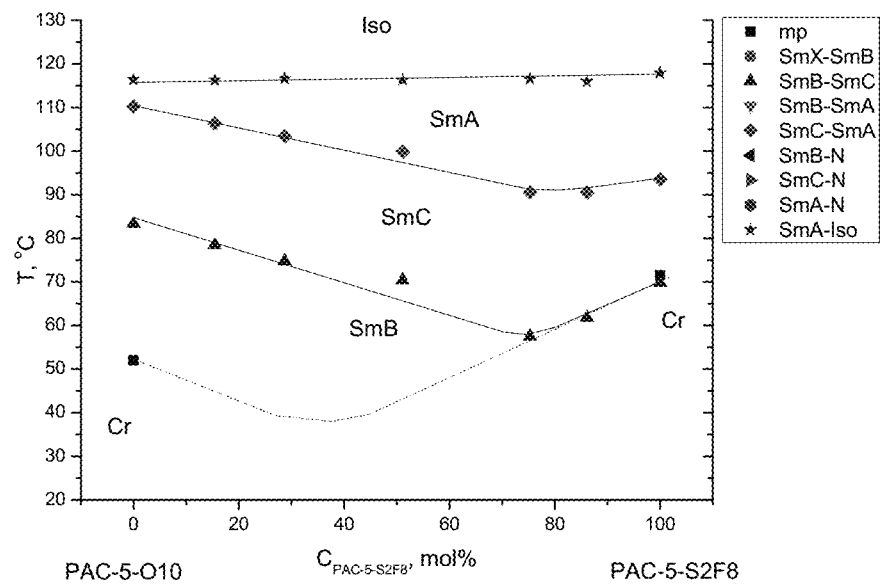
FIG. 15 shows phase diagrams for the influence of chiral compounds on phase transitions of FLC materials, according to an embodiment of the invention.
Figure 16:
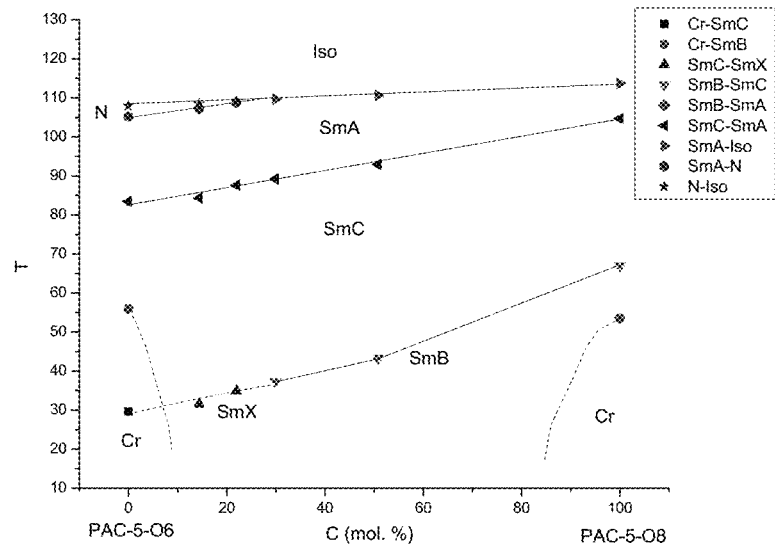
FIG. 16 shows phase diagrams for mixtures of various homologs of PAC series, according to an embodiment of the invention.
Figure 17:
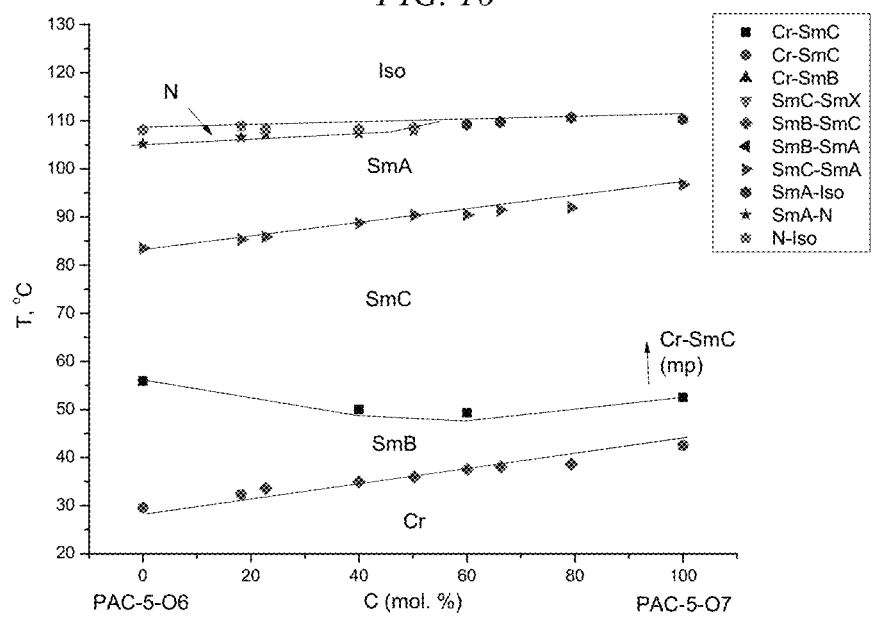
FIG. 17 shows phase diagrams for mixtures of various homologs of PAC series, with phase transitions Cr-SMC obtained upon heating and others upon cooling, according to an embodiment of the invention.
Figure 18:
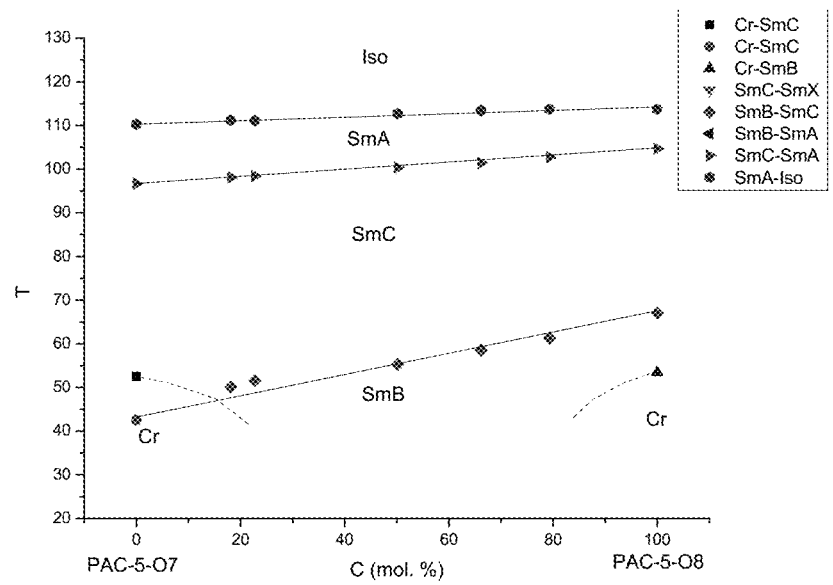
FIG. 18 shows phase diagrams for mixtures of various homologs of PAC series, according to an embodiment of the invention.
Figure 19:
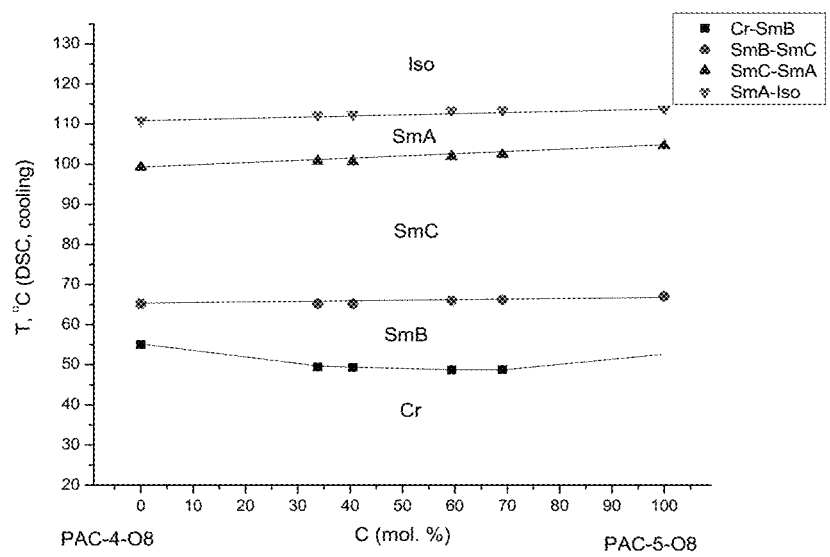
FIG. 19 shows phase diagrams for mixtures of various homologs of PAC series, according to an embodiment of the invention.
Figure 20:
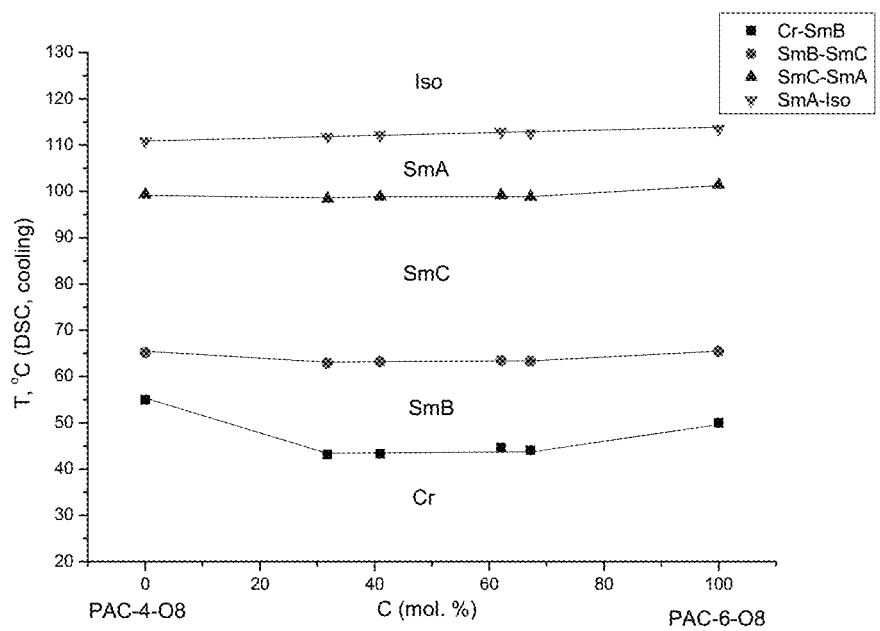
FIG. 20 shows phase diagrams for mixtures of various homologs of PAC series, according to an embodiment of the invention.
Figure 21:
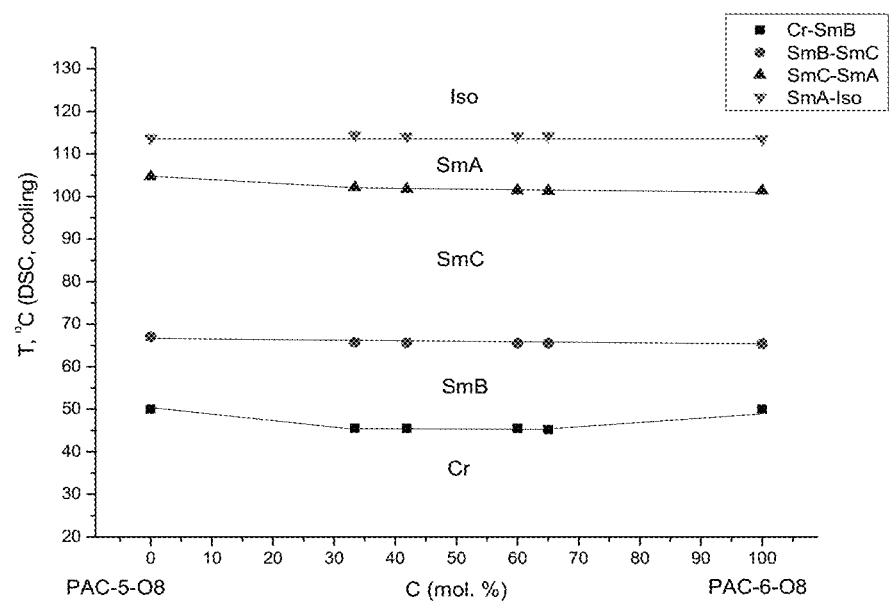
FIG. 21 shows phase diagrams for mixtures of various homologs of PAC series, according to an embodiment of the invention.
Figure 22:
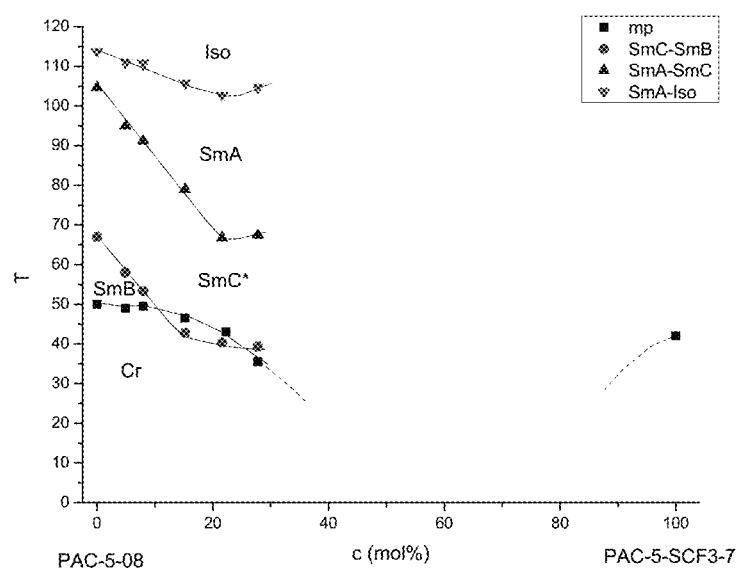
FIG. 22 shows phase diagrams for the influence of chiral compounds on phase transitions of FLC materials, according to an embodiment of the invention.

Typically, $\theta_C$ values increase with concentration of chiral dopant (CD) often reaching saturation at a CD level specific for each selected pairs of "CD-FLC host". In general, the chemical structure of the CDs effect on the $\theta_C$ value varies by the chemical class. In an embodiment of the invention, different types of chiral dopants effect the smectic tilt angle in the proposed FLC host where: small angles ($\theta_C$<10°) are induced by compounds bearing one chiral fragment, preferably a C*—F fragment and useful for fine adjustment of smectic tilt angles that are induced by other dopants; large angles ($\theta_C$>30°) are induced using chiral dopants having three-ring cores with two chiral fragments derived from 2-CF$_3$-1-alkanols; and intermediate angles (20°±9, for example 22.5°) that are induced with combinations of two types dopant for larger and smaller angles or using a PCP type dopant esterified with chiral 2-octanol or other C$_4$-C$_{16}$ chiral alcohol. The required amount of chiral component is similar to the content of non-chiral constituents, which effects phase transition and Δn values of the FLC materials. Surprisingly, for example, phenacylic ester bearing a chiral 2-fluorooctanol group shows a mesophase sequence similar to its non-chiral analogs, as shown in FIG. 15 and phase diagram for the FLC materials in FIGS. 16-21. It can be seen that the lowest melting point on the phase diagram of FIG. 15 occurs at a relatively high concentration of chiral dopant, about 75 mol %. On the other hand, other types of the chiral dopant suppress the SmC* phase even when the CD show mesogenic phases, for example, the mesogenic compound PCP-S2F8 affects the SmC* stronger than does the non-mesogenic (PAC-5-SCF3-7), as indicated in FIGS. 11 and 22.

Figure 23:
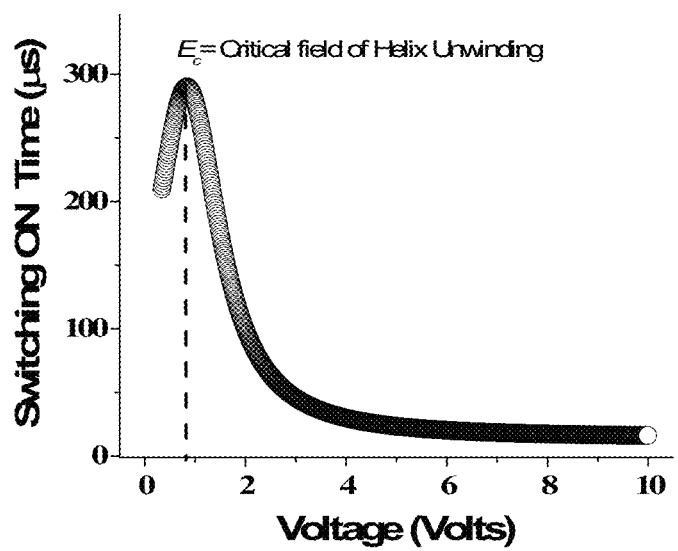
FIG. 23 shows a plot of the electro-optical response as a function of the voltage for mixture 7-191-M3 that resembles typical ESHFLCs with a cell gap of 3 μm, according to an embodiment of the invention.
Figure 24:
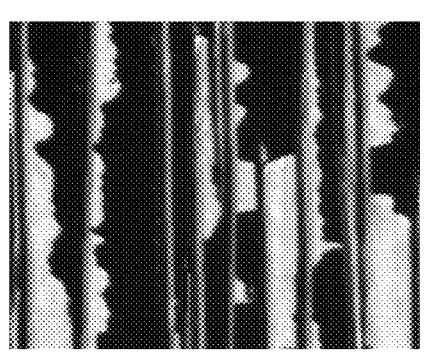
FIG. 24 shows an optical microscopic image of the texture of a low Δn FLC, an ESHFLC, example 7-191-M3, under cross polarization in the absence of the electric field and with a cell gap of 3 μm, according to an embodiment of the invention.
Figure 25:
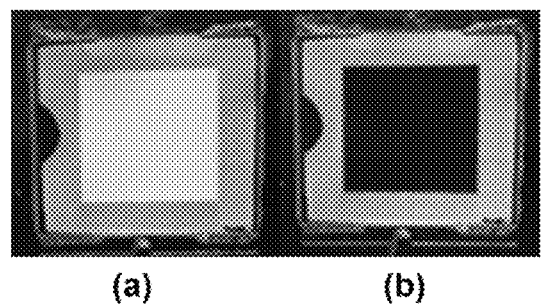
FIG. 25 shows photographs of a low Δn ESHFLC display cell in the bright state (a) and the dark state (b) for a FLC layer thickness of 3 μm, according to an embodiment of the invention.
Figure 26:
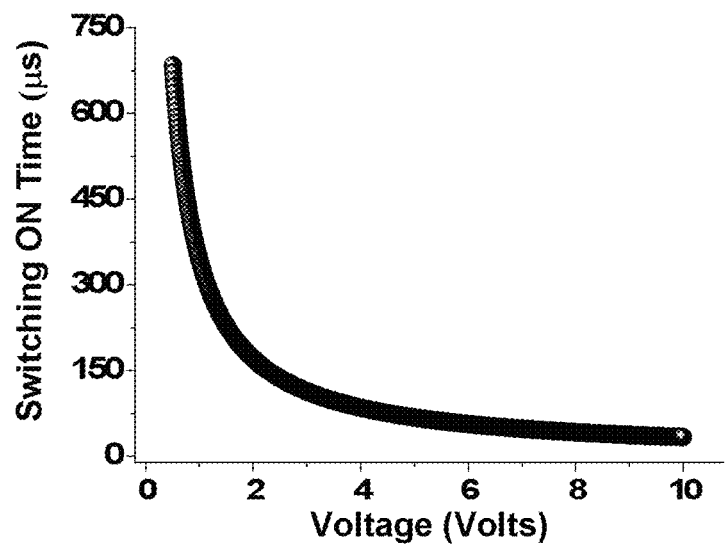
FIG. 26 shows a plot of the electro-optical switching time as a function of applied voltage for the mixture 7-130-M3 with a cell gap of 3 μm that resembles a surface stabilize ferroelectric liquid crystals, according to an embodiment of the invention.
Figure 27:
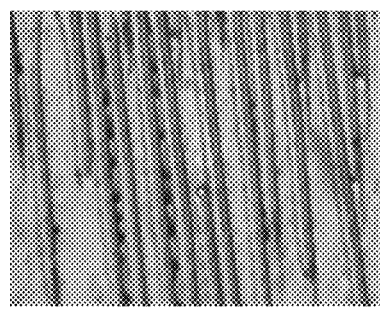
FIG. 27 shows a microscopic image of FLC7-130-M3 in a SSFLC mode with cell gap of 3 μm, according to an embodiment of the invention.

The electro-optics of the low Δn FLC has been studied in different electro-optical modes. The mixture number 7-191-M3, shown in Example 8, below, was infiltrated in the liquid crystals cell with planar alignment and thickness 3 μm. The cell was placed between the crossed polarizer and switching time was determined as a function of the applied voltage, and the measured Δn for mixture 7-191-M3 is about 0.110. The voltage dependence of the switching time is shown in FIG. 23. The switching time increases with applied voltage to a peak voltage followed by a decrease in the response time with greater voltage. The presence of the peak in the electro-optical response curve, which represents the electric field strength required to unwind the FLC helix, confirms that the cell infiltrated with 7-191-M3 show an electrically suppressed helix ferroelectric liquid crystal (ESHFLC) mode. The optical micro-photo graph has been shown in FIG. 24, which resembles a typical ESHFLC mode. FIG. 25 shows photographs of a display cell of the ESHFLC mode infiltrated with the low Δn ESHFLC mixture 7-191-M3 where the bright and dark states provide a high contrast. In contrast, the mixture number 7-130-M3 shown in the example 5, in a similar cell, shows the typical characteristics of a surface stabilized ferroelectric liquid crystal mode with measured Δn of ~0.109, as indicated in FIG. 26. The response time decreases with increasing driving voltage without displaying a peak that reflects suppression of the FLC helix by the cell surface. The optical microscopic image, as shown in FIG. 27, has the typical optical texture for the SSFLC mode.

Figure 28:
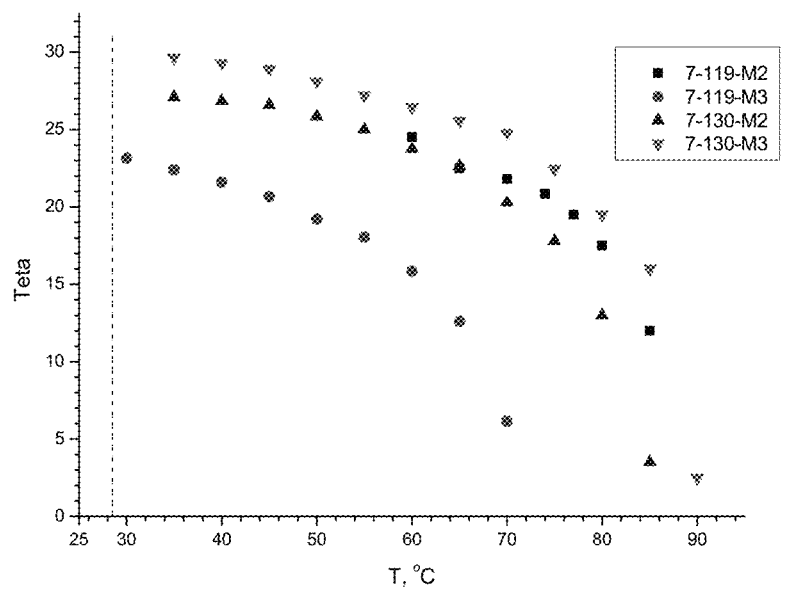
FIG. 28 shows a plot of the temperature dependence of the tilt angle of two low Δn FLC mixtures of Examples 2, 4, 5, and 8, according to an embodiment of the invention.
Figure 29:
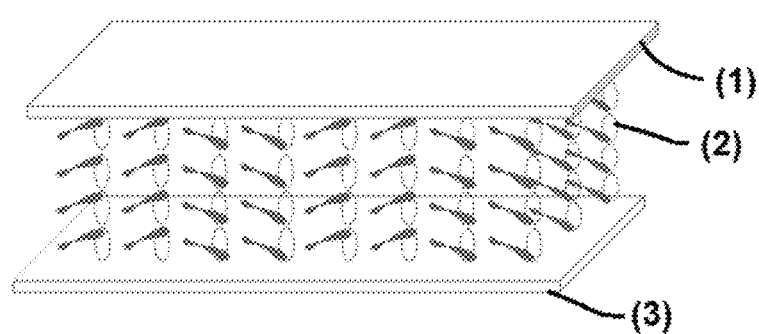
FIG. 29 shows a schematic drawing of a FLC Cell fabricated between two ITO coated glass plates (1) and (3), sandwiching a low Δn ferroelectric liquid crystal (2), according to an embodiment of the invention.

The FLC mixture can display a tilt angle that varies with temperature, as illustrated in FIG. 28 for two mixtures, according to an embodiment of the invention. The variability of the tilt angle, pitch, response temperature range, and low Δn makes these FLC mixtures applicable for cells for displays and other photonic devices. FIG. 29 shows a FLC cell, according to an embodiment of the invention, where the cell includes at least one transparent electrode, such as an ITO glass.

In an embodiment of the invention, PAC and PAC-PC type FLC mixtures display a Δn value of 0.105 to 0.12, which are the lowest Δn for a wide range of SmC based on the climatic f. These types of host components are summarized in Table 5, below. The PAC and PAC-PC type FLC mixtures can have SmC ranging from 34-48 to 90-140° C. In an embodiment of the invention, the SmC range can be 48 to 90-92° C. These mixtures easily overcool, up to room temperature, revealing a monotropic SmB phase or a higher order phase below the SmC phase. The SmB-SmC phase transitions are almost linearly dependent on the individual components.

TABLE 5

Main properties and features of phenacylic esters (PAC and PAC-PC) of current invention

| Compounds/Phase sequence and range of temperatures | Pros | Cons | Features |
| --- | --- | --- | --- |
| PAC<br>Cr $\xrightarrow{52-87}$ SmB $\xleftarrow{43-85}$ SmC $\xleftarrow{84-112}$ SmA $\xleftarrow{96-117}$ Iso | Cheap synthesis Have rather low Δn: 0.105 in the FLC mixtures Do not increase viscosity too much in the FLC mixutres | Manifests of SmB phase: it is difficult to suppress it does not allow preparation of eutectic mixtures with marked depression of melting point. Have not high enough thermal stability of SmC - not enough amount of additional Δn reducer can be added. | Favourable to induce moderate values of smectic tilt angle, $\theta_c$: 15-30° |
| PAC-PC<br>Cr $\xrightarrow{58-69}$ SmC $\xleftarrow{114-147}$ SmA $\xleftarrow{150-164}$ N $\xleftarrow{164-176}$ Iso | Very high thermal stability of SmC Robust to introducing tens % of Δn reducers Do not form SmB phases and often suppress them in the FLC mixtures | Multistep synthesis Have higher Δn than for PAC series: ~0.12 in the FLC mixtures Prone to increase viscosity in FLC, especially at high their content | When dominate in FLC mixtures, has trend to induce rather high smectic tilt angle, $\theta_c$, up to 47°. |

Figure 30:
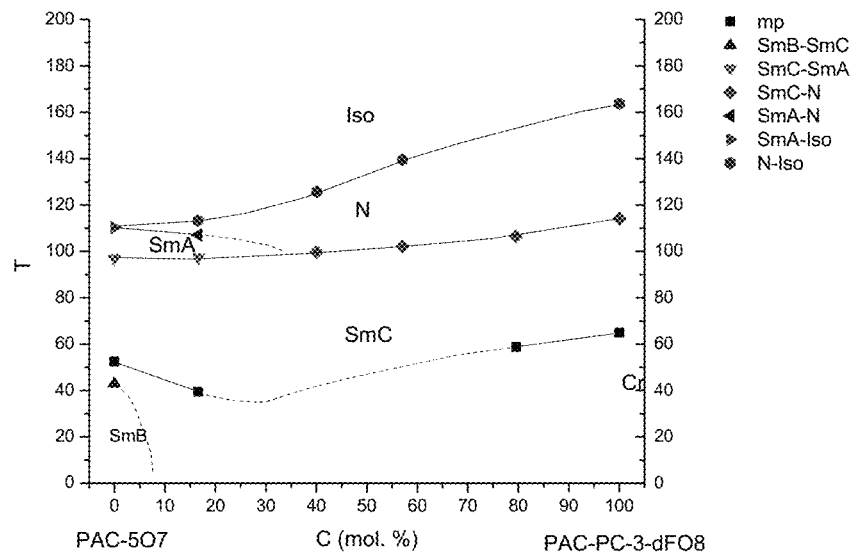
FIG. 30 shows phase diagrams of the mixtures of 2-(4-(heptyloxy)phenyl)-2-oxoethyl 4-pentylcyclohexanecarboxylate (PAC-5O7) and 2-oxo-2-(4-(4-propylcyclohexyl)phenyl)-ethyl 2,3-difluoro-4-(octyloxy)benzoate (PAC-PC3-dFO8), according to an embodiment of the invention.
Figure 31:
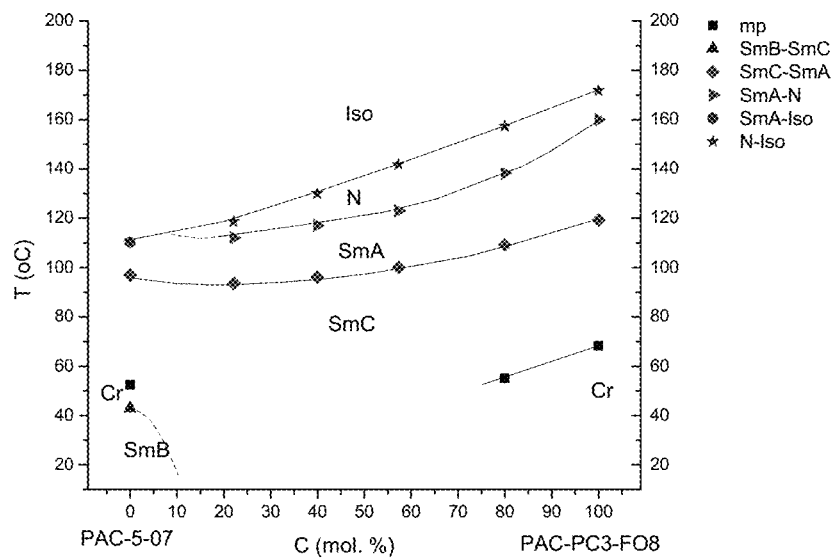
FIG. 31 shows phase diagrams of the mixtures of 2-(4-(heptyloxy)phenyl)-2-oxoethyl 4-pentylcyclohexanecarboxylate (PAC-5O7) and 2-oxo-2-(4-(4-propylcyclohexyl)phenyl)-ethyl 3-difluoro-4-(octyloxy)benzoate (PAC-PC3-FO8), according to an embodiment of the invention.

In the next embodiment of the invention, the PAC-PC types of compounds do not possess a SmB phase, moreover, in the mixtures with PAC this unwanted SmB is fully suppressed, as can be seen in FIGS. 30 and 31. Representatives of PAC-PC series have a wide-range SmC host, from 35 to 140° C., as in Example 13, below. However, if the content of PAC-PC compounds in the FLC host exceeds 50% with respect to the PAC, the viscosity and smectic tilt angle $\theta_c$ increase.

Figure 32:
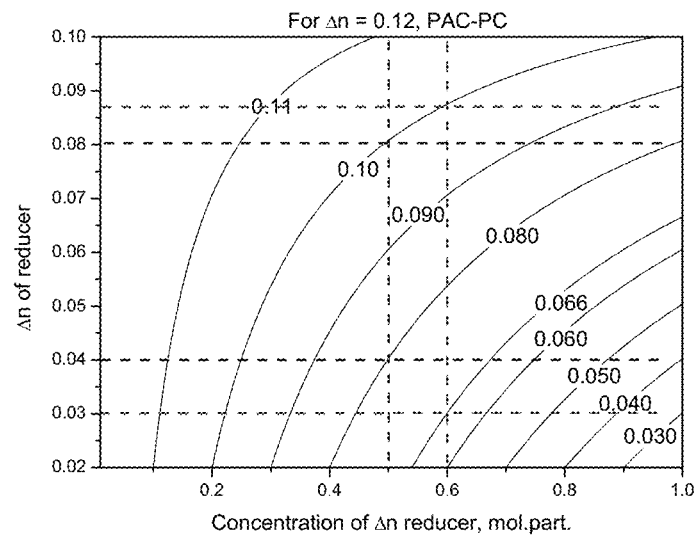
FIG. 32 shows a contour diagram of calculated Δn values vs Δn of reducer and its concentration estimated in linear approximation by Eqn. 3 for binary mixture of PAC-PC and a virtual Δn reducer, according to an embodiment of the invention.
Figure 33:
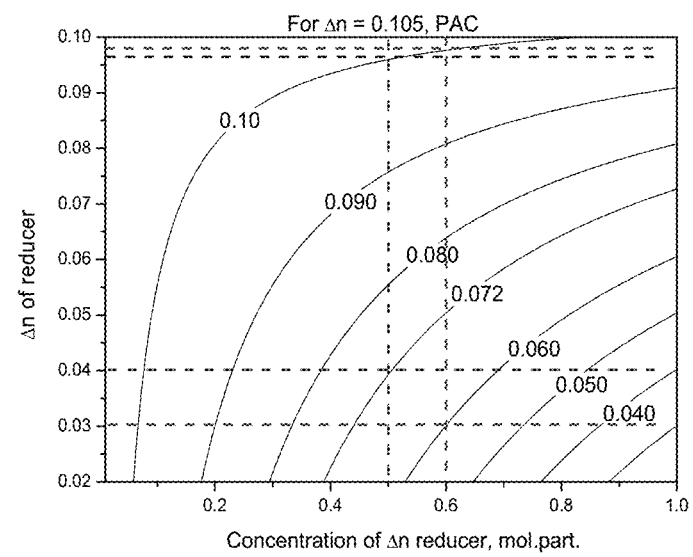
FIG. 33 shows a contour diagram of calculated Δn values vs Δn of reducer and its concentration estimated in linear approximation by Eqn. 3 for binary mixture of PAC and virtual Δn reducer, according to an embodiment of the invention.
Figure 34:
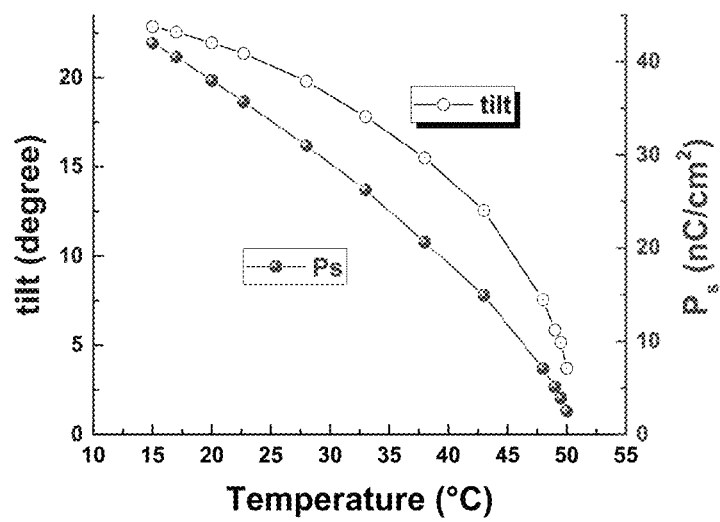
FIG. 34 shows plots of the temperature dependency of spontaneous polarization and tilt angle for FLC mixture according to Example 17, according to an embodiment of the invention.
Figure 35:
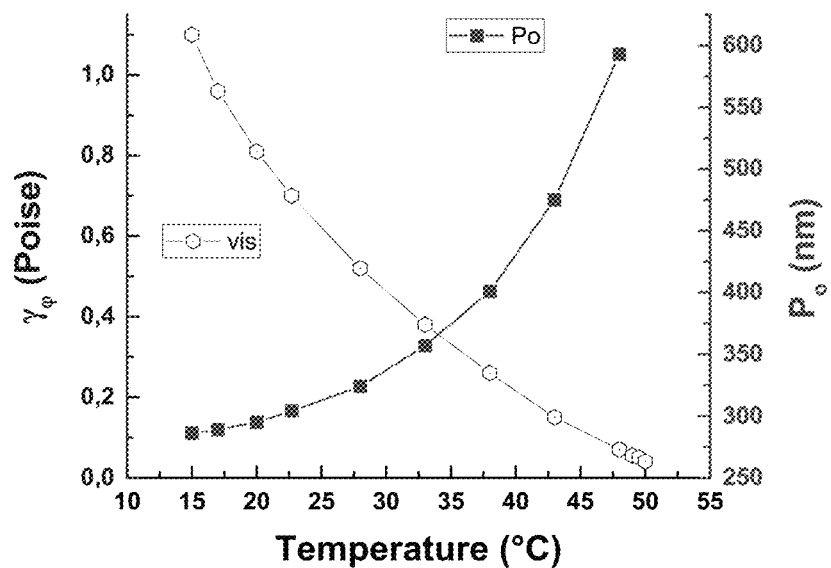
FIG. 35 shows plots of the temperature dependency of rotational viscosity and helical pitch for the FLC mixture according to Example 17, according to an embodiment of the invention.
Figure 36:
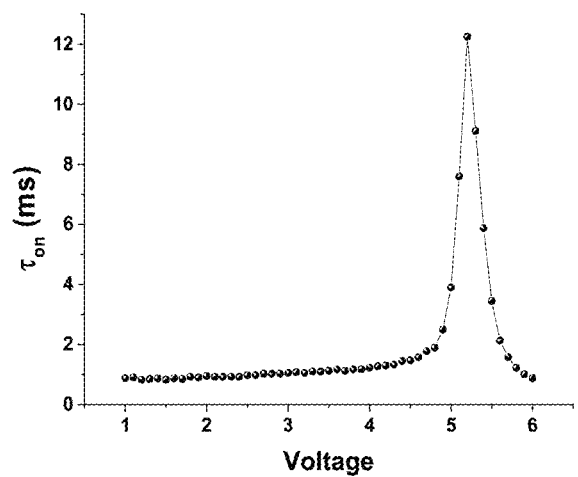
FIG. 36 shows a plot of the dependence of response time vs applied voltage at 21° C. for FLC mixture according to Example 17, according to an embodiment of the invention.
Figure 37:
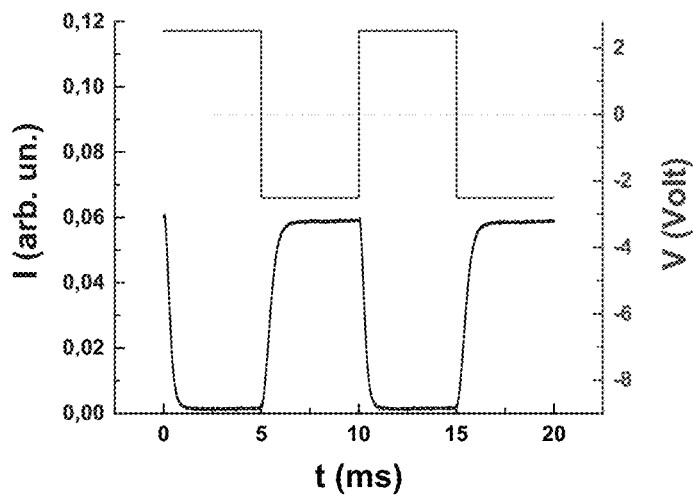
FIG. 37 shows plots of the time dependence of optical transmittance vs applied voltage for FLC mixture according to Example 17, according to an embodiment of the invention.

In an embodiment of the invention, another Δn and melting point reducers is included. By equation 3, above, an estimate of the content of various Δn reducers in binary mixtures with PAC or PAC-PC needed to reduce the inherent birefringence of the host from 0.105-0.12 to a target Δn value of 0.1 is shown in FIGS. 32 and 34, where the bottom horizontal lines represent the lowest Δn values (0.03 and more realistic 0.04) of currently known Δn reducers among calamitic LC. As can be seen in FIGS. 33 and 34, with Δn reducers of 50 or 60 mol. % in combination with the lowest birefringent dopant provides Δn values of mixtures that are, at most, 0.066 or 0.06, respectively. Any components that destroy the LC phase, in particular the SmC, also can reduce the order parameter of the LC phase and display a deviation from linear dependency of Eqn. 3, allowing the experimentally measured Δn to be smaller than the estimated value.

A representative list of compounds that can be used as Δn reducers is given in Table 1, where there are almost no LC compounds that combine a SmC phase with Δn values less than 0.08. Therefore, any such compounds chosen as Δn reducer will suppress the SmC phase of the host, and limit their content to 50 or, in the best case, 60 mol. %. All tested compounds showing lower Δn than PAC or PAC-PC reveal adverse effect on the SmC phase. In some cases, the SmC phase becomes inferior to the SmB phase and shows greater depression at high concentrations of dopant.

To facilitate comparison and selection of additives for basic SmC hosts comprising PACs and/or PAC-PCs, the influence of the dopants on the SmC and SmB phase transition temperatures for the mixtures is estimated by the slope of the corresponding line on the phase diagrams, as indicated in Table 6, below.

TABLE 6

Influence of the dopants on SmC and SmB phase transition temperatures in the mixtures

| Chemical structure of dopants | abbreviation | PAC ΔSmC*) | ΔSmB*) | PAC-PC ΔSmC*) | PAC-PC mix |
|---|---|---|---|---|---|
| $C_{10}H_{21}O$—⌬—⌬—C(O)O—⌬—$C_5H_{11}$ | CPEH | −13.6 | −4.7 | −16.2 | −32.0 |
| $C_5H_{11}$—⌬—⌬—C(O)O—⌬—$C_5H_{11}$ | | | | −10.5 | −24.00 |
| $C_5H_{11}$—⌬—⌬—C(O)O—⌬(F,F)—$OC_8H_{17}$ | | −4.00 | −14.80 | −10.0 | −27.00 |
| $C_5H_{11}$—⌬—⌬(F,F)—C(O)O—⌬—$C_5H_{11}$ | CPEF | | | | −11 |
| $C_5H_{11}$—⌬—⌬(F,F)—C(O)O—⌬(F)—$OC_8H_{17}$ | | | | −10.50 | −11.00 |
| $W_1$—⌬—C(O)O—⌬—O—$W_2$ | CHA-26 CHA-46 | −15.90 −12.00 | −16.40 −4.50 | | |
| $W_1$—$A_1$—⌬—⌬—$A_2$—$W_2$ | BC mix | | | −43.25 | |
| $C_3H_7$—⌬—⌬—C(O)O—R ; $C_2H_5$— | | | | −19.00 | |
| ⸾—O—CH$_2$—CHF—$C_6H_{13}$ | | | | −22.00 | −20.11 |
| ⸾—O—CH($CF_3$)—$C_8H_{17}$ | | | | −30.00 | −27.50 |

TABLE 6-continued

Influence of the dopants on SmC and SmB phase transition temperatures in the mixtures

| Chemical structure of dopants | abbreviation | PAC ΔSmC*) | ΔSmB*) | PAC-PC ΔSmC*) | PAC-PC mix |
|---|---|---|---|---|---|
| C₃H₇-[cyclohexyl]-[cyclohexyl]-C(=O)-O-[cyclohexyl]-C₃H₇ | DCHA-3 | | | −9.7 | −11.7 |
| R-C(=O)-O-[cholesterol] | C₂H₅ | −39 | −24 | | |
| | C₈H₁₇ | −26.50 | −18.70 | | |
| C₈H₁₇O-[2,3-difluorophenyl]- | | −9.000 | −21.000 | −8.400 | |
| C₅H₁₁-[cyclohexyl]- | | −16.500 | −22.000 | −17.100 | −10.700 |
| *R-C(=O)-O-[phenyl]-[cyclohexyl]-[phenyl]-C(=O)-O-R* | -O-CH(C₈H₁₇) | | | | −24.11 |
| | -O-CH₂-CHF-C₆H₁₃ | −19.30 | −4.60 | | |
| | -O-CH(CF₃)(C₈H₁₇) | | | | −24.125 |

*)Decreasing of the corresponding phase transition on temperature (° C.) per 10 mol. % of dopant added to PAC, PAC-PC, or PAC-PC mixtures prepared according to Example 13, below In general, SmC phase thermal stability of PAC type of materials is sensitive to some dopants required to improve Δn, mp, or other parameters. The relatively low concentrations of about 15-20% of bicyclohexyl carboxylate (DCHA-3) or cholesterol esters can fully suppress SmC phases, as indicated in FIGS. 5-7 and 10. Therefore, the total content of dopant cannot exceed 10-12 mol. % for compounds DCHA-3 and Chol-5CHA and no more than 5 mol. % for Chol-9. The SmC phase in the PAC-PC series appears more robust to these Δn reducers, and so, up to 25%, and, for several cases, up to 30 mol %, of dopant can be added.

Among other dopants, those which suppress SmB phase to a greater extent than SmC phase are useful. As can be seen from the Table 6, these requirements are satisfied using CPEH, short-tail Demus esters, and some cholesterols esters. These dopants can be used as Δn reducers for FLC mixtures in concentration up to 10-15 mol. % with an acceptable reduction in the upper-temperature limit for the SmC*. The two rings phenylpyrimidines are effective SmB suppressors, see for example, FIG. 14 using 9O-PP-O8 as an example. Because of the high birefringence of phenylpyrimidines (≈0.14) their content should be limited to 40 mol. %, such as 20 mol. %, in order to get an appropriate Δn values for working mixtures.

A chiral dopant (CD), being necessary to induce ferroelectric properties in a FLC host and the CD affects the SmC phase transitions. Phenacylic esters bearing the chiral 2-fluorooctanol group shows mesophases sequence similar to their non-chiral analogs, and the phase diagram pattern, see FIG. 15 and FIG. 4. The lowest melting point on the phase diagram of FIG. 15 is observed at relatively high concentration of chiral dopant, about 75 mol. %. The chiral dopant, derivative of terphenyldicarboxylic acid, which is widely used in FLC mixtures of higher Δn, is not effective for the FLC with low Δn, according to embodiments of the invention, as the resulting birefringence is too high, and additionally chiral dopant essentially reduces the SmC* upper limit and does not suppress fully the SmB phase.

Most electro-optical effects for the ferroelectric liquid crystals have different requirement for $p_0$ and $\theta_C$, as summarized in Table 7 below, which can be controlled by the types and/or concentration of the chiral dopants.

influence of the chemical structure of the chiral dopant on $\theta_C$ values varies among chemical classes. The smallest angles, $\theta_C<10°$, are induced by compounds bearing one chiral fragment, preferably C*—F. These dopants are useful for fine adjustment of smectic tilt angles induced by other dopants. The intermediate tilt angles, around 20° including 22.5°, can be induced by combinations of the two types dopant mentioned above or with one dopant of the PCP type esterified with chiral 2-octanol. The highest angles, $\theta_C>30°$, can be induced using chiral dopants having a three-ring core and two chiral fragments, such as, but not limited to, fluorine-containing CDs, such as, but not limited to derivatives of 2-$CF_3$-1-alkanols.

The electro-optics of the low Δn FLCs, as illustrated Examples 2-5, 7-8 and 14, below, find application in so-called low-twisted FLC modes, such as SSFLC or ESH modes, whereas Examples 15-18, below 17-20 are useful for DHFLC's as indicated in FIGS. 34-39. The DHF mixtures include a higher content of CD to obtain a sufficiently tight helical pitch to provide Bragg diffraction in wavelengths shorter than visible range.

For a mixture, such as that of Example 5, below, filled in a similar cell as that disclosed, above, the typical characteristics of the surface stabilized ferroelectric liquid crystal

TABLE 7

Variation for Main Parameters in Current Electro-Optical Effects in FLCs

| Properties | Surface stabilized FLC mode (SSFLC) | Electrically suppressed helix FLC (ESHFLC) | Deformed helix FLC (DHFLC) |
|---|---|---|---|
| Tilt angle (°) | 22.5 | 22.5 | 35-45 |
| Temperature dependence of tilt angle | Strongly affects the optical contrast of the device. | Strongly affects the optical contrast of the device. | No or weakly affects the optical contrast of the device. |
| Pitch (nm) | >much larger than the cell gap (~10-20 μm) | Comparable but smaller than the cell gap (~0.3-2 □μm) | Much smaller than the cell gap < λ (wavelength of the visible light) (<300 nm) |
| Ps, nC/cm² | Sufficiently Small | Sufficiently Small | Sufficiently large |
| Anchoring energy limitations | Should be stronger than the elastic energy of the helix | Should be comparable but smaller than the elastic energy of the helix | The elastic energy of the helix is very high. |

Dopants with rather large transverse dipole directly attached to the chiral center provide sufficiently large Ps. This is the case for most dopants described herein, but the invention is not limited to typical polar units, such as C*—F, C*—$CF_3$, C*—O—C, where C* denotes an asymmetric chiral carbon. Cholesterol derivatives those do not possess C*—F, C*—$CF_3$ fragments do not induce either a significant spontaneous polarization or a short helical pitch in the FLC mixture and these compounds are used as Δn reducers.

The ability for helix formation is indicated by lower values of HTP, which is typical for mono-substituted dopants, those containing only one chiral fragment at one of the terminal positions of a dopant molecule. With respect to the chemical structure of the chiral fragment, the sequence C*—F<C*—O—C<C*—$CF_3$ correlates to increasing HTP.

Typically, the $\theta_C$ value increases with concentration of CD, often reaching saturation of CD content specifically for a given selected pair with a "CD-FLC host". In general, the mode are displayed with a measured Δn of ~0.109, as illustrated in FIG. 26. The response time decreases with increasing driving voltage without manifesting any sign of a peak in the response time that reflects a suppression of the FLC helix by the cell surface. Therefore, the response time simply decreases with the applied voltage. The optical microscopic image, shown in FIG. 27, shows the typical optical texture for the SSFLC mode.

For a mixture, such as that of Example 8, below, was infiltrated in the liquid crystals cell with planar alignment and thickness 3 μm. Thereafter, the cell was placed between crossed polarizers and the time of application of current, as a function of the applied voltage, was studied to understand the nature of the electro-optical mode. The measured Δn for the mixture is ~0.110. The voltage dependence of the time under current, the switching on time, is shown in FIG. 23. The switching on time, first, increases with applied voltage and shows decreases after the peak response. The presence of the peak in the electro-optical response curve, which represents the electric field strength required to unwind the FLC helix, confirms that the cell with the mixture show an electrically suppressed helix ferroelectric liquid crystal (ES-HFLC) mode. The optical micro-photo graph shown in FIG. 24 resembles a typical ESHFLC mode. The photographs of a display cell of the ESHFLC mode infiltrated with the low Δn ESHFLC mixture is shown in FIG. 25. The bright and dark state show high contrast.

Materials and Methods

Synthesis

Demus esters (n-CHA-m), Bicyclohexane derivatives (BC), Phenylcyclohexane carboxylic acid esters (PCH), Bicyclohexyl carboxylic acid esters (DCHA), Phenylpyrimidine derivatives (PP) Cholesterol derivatives (Chol-n) are commercially available materials and used as is. The 4,4"-terphenyl derivatives, preferably $A_1=A_2=COO$ bridge group (TDA) were obtained as it was described in Pozhidaev et al *Journal of Materials Chemistry* C, 2016, 4, 10339-46.

The synthesis of phenacylic esters of PAC and PAC-PC types, were carried out as indicated in Scheme 1, above.

The synthesis of phenacylic esters of type PAC and PAC-PC were carried out in the manner disclosed in Huang et al. *Synthetic Communications,* 1988, 18(10), 1167-70, except for the isolation and purification. A mixture of a corresponding carboxylic acid (5.5 mmol), phenacyl bromide (5 mmol), potassium carbonate (5.5 mmol), polyethylene glycol (M=4000, 1.1 mmol) and acetonitrile (15 ml) was stirred at room temperature for 20 min and refluxed about 1.5 hours. The reaction mixture was evaporated to dryness at reduced pressure, suspended in 50 mL of 1:1 v/v benzene-hexane mixture, filtered through short pad of silica gel and washed twice with 30 ml of the same solvent, evaporated to dryness, crystallized twice from acetonitrile or 2-propanol and dried in vacuo. The products were dissolved in a minimal volume of benzene and filtered through short path of silica gel on a PTFE sub-micro filter (0.2 μm pore size). The silica gel was washed with benzene, evaporated to dryness under a steam of nitrogen, and dried in vacuo. Thermal characteristics and phase sequences for these obtained compounds are given in Tables 2 and 3, above.

Synthesis of 1-aryl-2-bromo-1,1-difluoroethanes

To degassed the solution of corresponding phenacyl bromide (29.9 mmol) in 50 mL of dry benzene under $N_2$ atmosphere, 6 mL of DAST (44.9 mmol) was added at ambient temperature. The mixture was stirred for 20 hours, then heated up to 45° C. for 20 hours till reaction was completed (monitored by GC-MS). Then the mixture of 20 g of $NaHCO_3$ in 200 mL of ice-water was added, organic materials was extracted with DCM, washed with water, dried over $Na_2SO_4$, filtered and evaporated to dryness. The oil residue comprising 95-96% of a main component by GC-MS, was used for the next step without additional purification.

Synthesis of 1-aryl-1,1-difluoro-2-hydroxyethanes

A mixture of crude 2-bromo-1,1-difluoro-1-arylethanes (21 mmol), 8.4 g of KOAc (86 mmol), 4.1 g 18-crown-6 (16 mmol) in dry DMF was refluxed till reaction was completed as indicated by GC-MS analysis, typically 12-16 hours. The reaction mixture was evaporated to dry at reduced pressure, dissolved in 130 mL of EtOH, and a solution of 8 g NaOH in 40 mL water was added. The mixture was refluxed for 30 min and the EtOH was evaporated. To the residual water was added HCl and the pH was adjusted to 3-4. Organic materials were extracted with DCM, washed with water, dried over $Na_2SO_4$, and evaporated to dryness. The product was isolated by column chromatography on silica gel using hexane-ethyl acetate mixture as eluent. After evaporation the semi-solid product was purified by crystallization from MeCN. Yield 30-35%.

Synthesis of 1-aryl-2-bromoethanes

To a degassed solution of the corresponding phenacyl bromide (2.55 mmol) in 10 mL of dry trifluoroacetic acid under $N_2$ atmosphere was added 1.02 mL of triethylsilane (6.37 mmol) at 5-10° C. The mixture was stirred for 25 hours, then heated to 60° C. for 30 min. A 100 mL portion of ice-water was added, and organic materials was extracted with DCM, washed with water, dried over $Na_2SO_4$, filtered, and evaporated to dryness. The oil residue, having 86-88% of a main component by GC-MS analysis, was purified by flash chromatography on silica gel/hexane and used without additional purification.

Synthesis of 1-aryl-2-hydroxyethanes

A mixture of the crude 2-bromo-1-arylethanes, 1.0 g of KOAc (10.2 mmol), 0.6 g PEG-4000 in 40 mL of dry DMF was refluxed till reaction was completed as monitored by GC-MS, typically 16 hours. The reaction mixture was evaporated to dryness at reduced pressure, purified by flash-chromatography on silica gel/benzene-hexane (1:1 v/v), evaporated to dryness, dissolved in 25 mL of EtOH and a solution of 2.5 g KOH in 20 mL of water was added. The mixture was refluxed for 2 hours and cooled. EtOH was evaporated to residue water and hydrochloric acid was added to achieve a pH 3-4. Organic materials were extracted with DCM, washed with water, dried over $Na_2SO_4$, and evaporated to dryness. The product was isolated by column chromatography on silica gel using hexane as eluent. After evaporation of the oil, product was crystallized, with a yield 85% from the phenacyl bromide.

Esterification of 1-aryl-2-hydroxyethanes or 1-aryl-1,1-difluoro-2-hydroxyethanes, General Procedure To an ice-water cooled mixture of 0.66 mmol of the corresponding 1-aryl-2-hydroxyethane, 0.68 mmol of the appropriate carboxylic acid, and a few mg of DMAP in 6 mL of dry DCM, a solution of 165 mg of DCC (0.79 mmol) in 2 mL of DCM was added dropwise. The reaction mixture was stirred overnight, filtered through a short path of silica gel, washed with 15 mL of DCM, and evaporated to dryness. The residue was crystallized from acetonitrile or 2-propanol and dried in vacuo. The product was dissolved in a minimal volume of benzene and filtered through a short path of silica gel on a PTFE 0.2 μm pore size filter. The silica gel was washed with benzene, evaporated to dryness under a steam of nitrogen and dried in vacuo. Thermal characteristics and phase sequences for thus obtained compounds are given in Table 5, below.

TABLE 5

Phase transition temperature of cyclohexylphenylethyl esters CPEH (X = H) and CPEF (X = F)

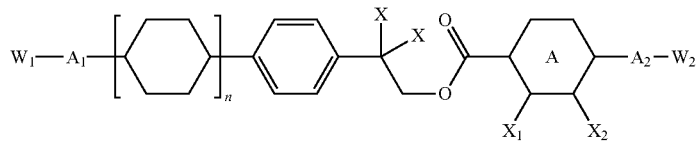

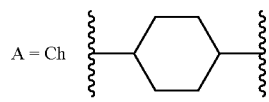

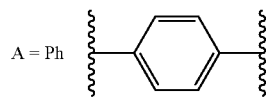

| $W_1$ | $A_1$ | X | $X_1$ | $X_2$ | A | $W_2$ | $A_2$ | Cr | | N | | Iso |
|---|---|---|---|---|---|---|---|---|---|---|---|---|
| 5 | — | H | — | — | Ch | 5 | — | • | | 111.2 | | • |
| 5 | — | F | — | — | Ch | 5 | — | • | | 85.5 | | • |
| 5 | — | F | H | H | Ph | 8 | — | • | 56 (37) | (•) | 45 | • |
| 5 | — | H | H | F | Ph | 8O | O | • | | | | • |
| 5 | — | H | F | F | Ph | 8O | O | • | 74.8 | • | 88.1 | • |
| 5 | — | F | H | F | Ph | 8O | O | • | 56 (35) | (•) | 56 | • |
| 5 | — | F | F | F | Ph | 8O | O | • | 60 (45) | (•) | 58 | • |

Synthesis of cholesterol trans-4-alkylcyclohexane carbxylates was performed essentially as described for esterification of 1-aryl-2-hydroxyethanes, above.

Cholesterol trans-4-pentylcyclohexane carbxylates was obtained in 56% yield and showed the following phase transitions: Cr 117-118° C. SmA. 208.5 N* 237 Iso.

Synthesis of Esters of
1,4-bis(4-carboxyphenyl)cyclohexane (PCP)

Synthesis of 1,4-diphenylcyclohexane

To a refluxed solution of phenylmagnesium bromide, obtained from 9.0 ml bromobenzene (86.1 mmol) and 2.8 g Mg (115 mmol) in 110 ml THF, was added dropwise the solution of 10 g 4-phenylcyclohexanone (57.4 mmol) in 40 mL dry THF for 40 min. The reaction mixture was refluxed for 6 hours, cool down to ambient temperature and poured into 50 mL of AcOH in ice water. Organic materials were extracted into EtOAc and evaporated to dryness. The solid residue was refluxed with 0.2 g of 4-toluensulfonic acid in 250 mL toluene using a Dean-Stark water trap for 10 hours, cooled, filtered through a short path of silica gel, and evaporated to dryness. Solid residue was dissolved in 150 mL of dry THF, flashed with $N_2$, 0.5 g of 10% Pd/C was added, and the mixture hydrogenated till $H_2$ absorption was completed, approx. for 15 h. Catalyst was filtered, washed with toluene, filtrate was evaporated to dryness and solid residue was crystallized from 200 mL EtOH to furnish 4.97 g of needle crystals, yield 37%.

Synthesis of 1,4-bis(4-carboxyphenyl)cyclohexane

To a suspension of 4.5 g anhydrous $AlCl_3$ (34 mmol) cooled to 2° C. in 20 ml DCM 6.0 mL of $(COCl)_2$ (69 mmol) was added at that temperature. The reaction mixture was stirred for 10 min and solution of 1,4-diphenylcyclohexane in 70 ml DCM was added drop wise for 1 hour at temperatures below 5° C. and stirred overnight. The reaction mixture was poured onto 400 g of an ice-HCl mixture, the volatile solvent evaporated, and the solid residue was filtered, washed with water, and dried. The product was purified using extraction with hot acetonitrile in a Soxlet apparatus, the extract was cooled, and fine crystal filtered and dried. Yield 3.98 g.

Esterification of
1,4-bis(4-carboxyphenyl)cyclohexane with
S-2-octanol, General Procedure A mixture of 0.895 g of 1,4-bis(4-carboxyphenyl)cyclohexane (2.5 mmol) and a few drops of DMF was refluxed in 15 mL of $SOCl_2$ until the solution become homogeneous and an additional 3 hours. Then reaction mixture was evaporated to dryness, the residue dried in vacuo, dissolved in 30 mL of refluxing toluene to which a solution of 2 mL of S-2-octanol (12.6 mmol) was added. A solution of 3 mL pyridine (22 mmol) in 9 mL of toluene was added. The reaction mixture was refluxed for an additional 5 hours, filtered through a short path of silica gel, the silica washed with toluene (3×10 mL), and the combined filtrate was evaporated to dryness. The solid residue was crystallized twice from acetonitrile to yield 0.42 g (31%) of colorless fine crystals, mp 68.4-69.4° C.

In like manner, 0.40 g of 1,4-bis(4-(2-flouro-1-octylcarbonyloxyphenyl)cyclohexane was obtained in a 35% yield from 0.9 g of S-2-flouro-1-octanol and 0.644 g of 1,4-bis (4-carboxyphenyl)cyclohexane. Phase transitions are Cr 72.6 SmA 111.0 Iso.

In like manner, 0.25 g of 1,4-bis(4-(2-trifluoromethyl-1-heptylcarbonyloxyphenyl)-cyclohexane was obtained in a 40% yield (mp 54.1-54.9° C.) from 0.307 g of 1,4-bis(4-carboxyphenyl)cyclohexane and 0.870 g of S-1,1,1-trifluoro-2-octanol 0.25 g of 1,4-bis(4-(2-trifluoromethyl-1-heptylcarbonyloxyphenyl)cyclohexane.

Examples of FLC Mixtures

Example 1

Mixture 7-110-M2

| Chemical structure of components | Wt % |
|---|---|
| 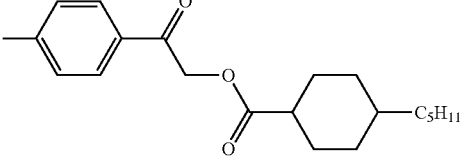 | 81.6 |
| 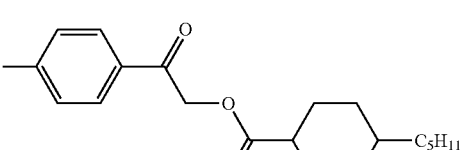 | 18.4 |
| Estimated Δn | 0.119 |
| Phase transitions | Iso 104.1 SmA 86.0 SmC* 36 SmB |

Example 2

Mixture 7-119-M1 of the Following Components

| Chemical structure of components | Wt % |
|---|---|
| $C_6H_{13}$—O—⟨phenyl⟩—C(O)—CH$_2$—O—C(O)—⟨cyclohexyl⟩—$C_5H_{11}$ | 51.2 |
| $C_7H_{15}$—O—⟨phenyl⟩—C(O)—CH$_2$—O—C(O)—⟨cyclohexyl⟩—$C_5H_{11}$ | 35.4 |
| 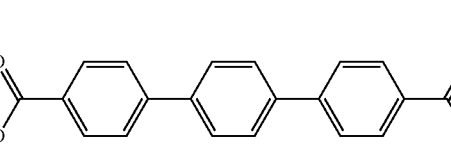 | 13.4 |
| Estimated Δn | 0.113 |
| Phase transitions | Iso 101.2 SmA 76.0 SmC* 30 Cr |

*)Temperature dependencies of these parameters are shown in FIGS. 28.

Example 3

Mixture 7-119-M3 of the Following Components

| Chemical structure of components | |
|---|---|
| $C_6H_{13}$—O—⟨benzene⟩—C(=O)—CH$_2$—O—C(=O)—⟨cyclohexane⟩—$C_5H_{11}$ | 52.4 |
| $C_7H_{15}$—O—⟨benzene⟩—C(=O)—CH$_2$—O—C(=O)—⟨cyclohexane⟩—$C_5H_{11}$ | 36.1 |
| $C_6H_{13}$*—CH(CH$_3$)—O—C(=O)—⟨benzene⟩—⟨cyclohexane⟩—⟨benzene⟩—C(=O)—O—CH(CH$_3$)—*$C_6H_{13}$ | 11.5 |
| Estimated Δn | 0.102 |
| Phase transitions | Iso 99.0 SmA 67.4 SmC* 33 Cr |

Example 4

Mixture 7-130-M2

| Chemical structure of components | Wt % |
|---|---|
| $C_6H_{13}$—O—⟨benzene⟩—C(=O)—CH$_2$—O—C(=O)—⟨cyclohexane⟩—$C_5H_{11}$ | 47.8 |
| $C_7H_{15}$—O—⟨benzene⟩—C(=O)—CH$_2$—O—C(=O)—⟨cyclohexane⟩—$C_5H_{11}$ | 33.0 |
| $C_8H_{17}$—⟨pyrimidine⟩—⟨benzene⟩—O$C_6H_{13}$ | 1.3 |
| $C_8H_{17}$—⟨pyrimidine⟩—⟨benzene⟩—O$C_8H_{17}$ | 1.1 |
| $C_8H_{17}$—⟨pyrimidine⟩—⟨benzene⟩—O$C_{10}H_{21}$ | 1.2 |

| Chemical structure of components | Wt % |
|---|---|
| C₁₀H₂₁O—[pyrimidine]—[phenyl]—OC₈H₁₇ | 6.6 |
| F₃C—CH(C₆H₁₃)—O—C(O)—[phenyl]—[phenyl]—[phenyl]—C(O)—O—CH(C₆H₁₃)—CF₃ | 8.9 |
| Estimated Δn | 0.113 |
| Phase transitions | Iso 102.0 SmA 78.5 SmC* 35 Cr |

*⁾Temperature dependencies of these parameters are shown in FIG. 28.

Example 5

Mixture 7-130-M3

| Chemical structure of components | |
|---|---|
| C₆H₁₃—O—[phenyl]—C(O)—CH₂—O—C(O)—[cyclohexyl]—C₅H₁₁ | 47.3 |
| C₇H₁₅—O—[phenyl]—C(O)—CH₂—O—C(O)—[cyclohexyl]—C₅H₁₁ | 32.6 |
| C₈H₁₇—[pyrimidine]—[phenyl]—OC₆H₁₃ | 1.3 |
| C₈H₁₇—[pyrimidine]—[phenyl]—OC₈H₁₇ | 1.1 |
| C₈H₁₇—[pyrimidine]—[phenyl]—OC₁₀H₂₁ | 1.2 |
| C₁₀H₂₁O—[pyrimidine]—[phenyl]—OC₈H₁₇ | 6.5 |
| C₄H₉O—C(O)—CH(CH₃)—O—C(O)—[phenyl]—[phenyl]—[phenyl]—C(O)—O—CH(CH₃)—C(O)—OC₄H₉ | 10 |
| Estimated Δn, | 0.115 |
| Phase transitions | Iso 102.0 SmA 78.5 SmC* 35 Cr |

*⁾Temperature dependencies of these parameters are shown in FIG. 28.

Example 6
Mixture 7-130-M4
| Chemical structure of components | Wt % |
|---|---|
| 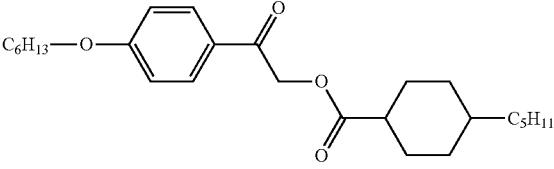 | 48.1 |
| 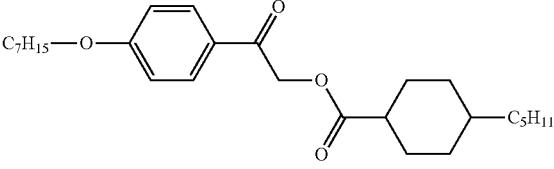 | 33.2 |
| 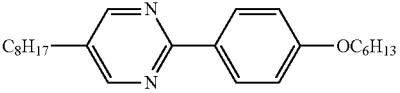 | 1.3 |
| 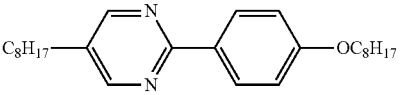 | 1.1 |
| 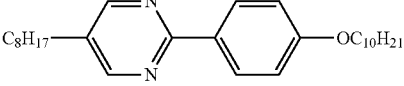 | 1.2 |
| 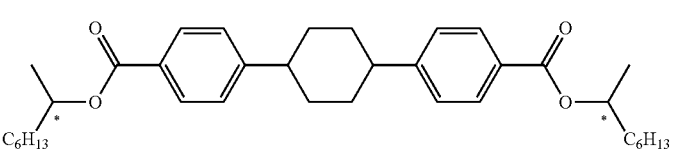 | 6.6 |
| 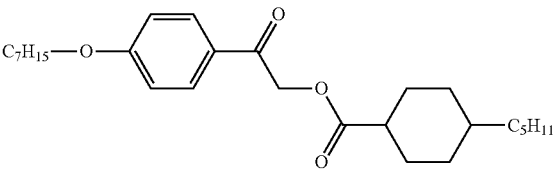 | 8.5 |
| Estimated Δn | 0.106 |
| Phase transitions | Iso 98.3 SmA 72.5 SmC* 33.5 Cr |
Example 7
Mixture 7-191-M2
| Chemical structure of components | Wt % |
|---|---|
| | 55.8 |

-continued

| Chemical structure of components | Wt % |
|---|---|
| C₄H₉—⟨cyclohexyl⟩—C(=O)—O—⟨phenyl⟩—OC₆H₁₃ | 4.1 |
| C₄H₉—⟨cyclohexyl⟩—C(=O)—O—⟨phenyl⟩—OC₈H₁₇ | 4.5 |
| C₆H₁₃—⟨cyclohexyl⟩—C(=O)—O—⟨phenyl⟩—OC₆H₁₃ | 2.2 |
| C₈H₁₇—⟨pyrimidine⟩—⟨phenyl⟩—OC₆H₁₃ | 4.9 |
| C₈H₁₇—⟨pyrimidine⟩—⟨phenyl⟩—OC₈H₁₇ | 4.3 |
| C₈H₁₇—⟨pyrimidine⟩—⟨phenyl⟩—OC₁₀H₂₁ | 4.8 |
| C₁₀H₂₁O—⟨pyrimidine⟩—⟨phenyl⟩—OC₈H₁₇ | 10.2 |
| (C₆H₁₃)CH(CH₃)—O—C(=O)—⟨phenyl⟩—⟨cyclohexyl⟩—⟨phenyl⟩—C(=O)—O—CH(CH₃)(C₆H₁₃) | 9.2 |
| Estimated Δn | 0.115 |
| Phase transitions | Iso 90 SmA 65.0 SmC* 16 Cr |

Figure 40:
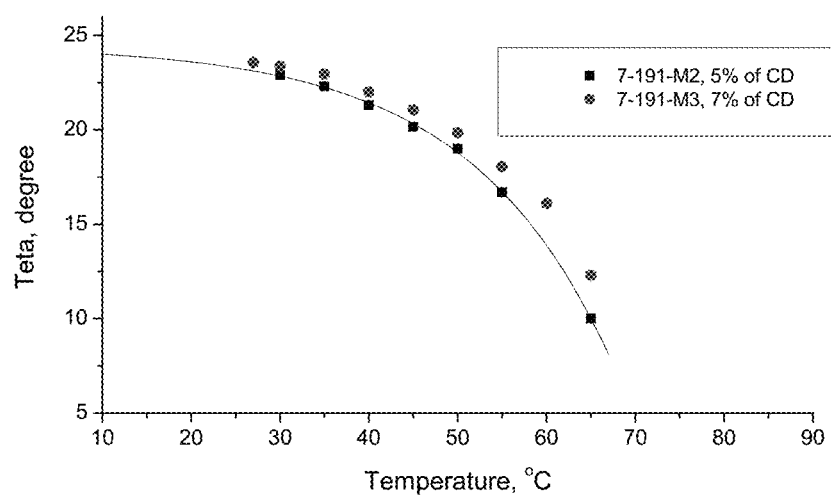
FIG. 40 shows plots of the temperature dependency on the tilt angle for FLC mixtures according to Examples 7 and 8, according to an embodiment of the invention.
Figure 41:
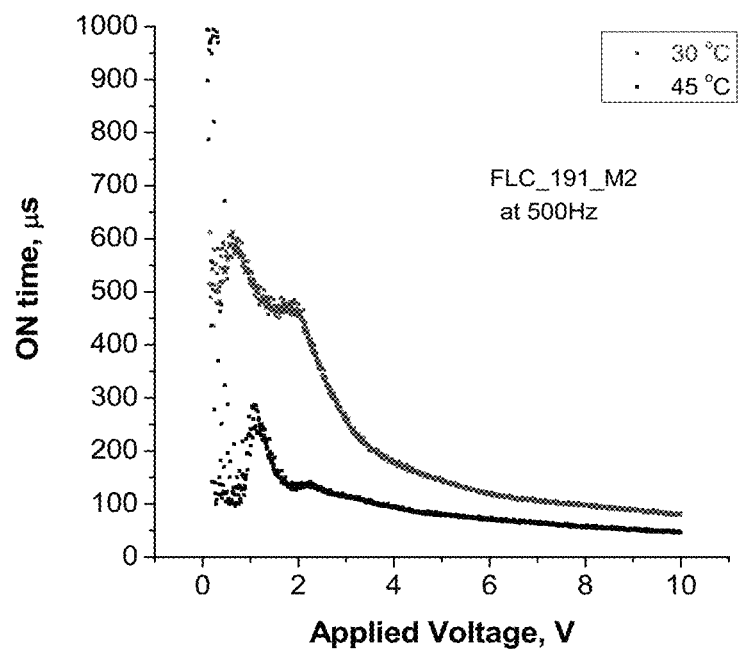
FIG. 41 shows plots of the temperature dependency on the response time for FLC mixtures according to Example 7, according to an embodiment of the invention.
Figure 42:
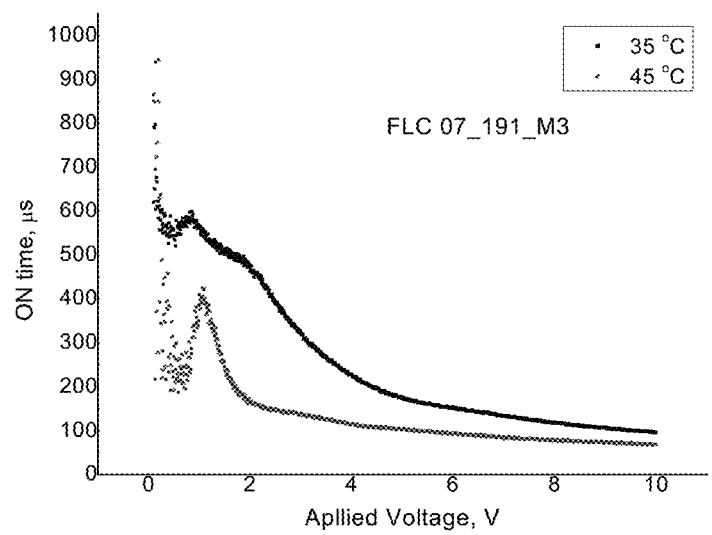
FIG. 42 shows plots of the temperature dependency on the response time for FLC mixtures according to Example 8, according to an embodiment of the invention.

*⁾Temperature dependencies of these parameters are shown in FIGS. 40, and 41.

Example 8

Mixture 7-191-M3

| Chemical structure of components | Wt % | Mol % |
|---|---|---|
| C₇H₁₅—O—⟨phenyl⟩—C(=O)—CH₂—O—C(=O)—⟨cyclohexyl⟩—C₅H₁₁ | 54.8 | 54.1 |

-continued

| Chemical structure of components | Wt % | Mol % |
|---|---|---|
| C₄H₉–[cyclohexyl]–C(=O)O–[phenyl]–OC₆H₁₃ | 4.6 | 5.4 |
| C₄H₉–[cyclohexyl]–C(=O)O–[phenyl]–OC₈H₁₇ | 5.0 | 5.4 |
| C₆H₁₃–[cyclohexyl]–C(=O)O–[phenyl]–OC₆H₁₃ | 2.5 | 2.7 |
| C₈H₁₇–[pyrimidine]–[phenyl]–OC₆H₁₃ | 5.4 | 6.2 |
| C₈H₁₇–[pyrimidine]–[phenyl]–OC₈H₁₇ | 4.7 | 5.0 |
| C₈H₁₇–[pyrimidine]–[phenyl]–OC₁₀H₂₁ | 5.3 | 5.3 |
| C₁₀H₂₁O–[pyrimidine]–[phenyl]–OC₈H₁₇ | 11.3 | 10.9 |
| iPr(C₆H₁₃*)–O–C(=O)–[phenyl]–[cyclohexyl]–[phenyl]–C(=O)–O–iPr(C₆H₁₃*) | 6.4 | 5.0 |
| Estimated Δn | 0.109 | |
| Phase transitions | Iso 89 SmA 67.0 SmC* 19 Cr | |

*)Temperature dependencies of these parameters are shown in FIGS. 40, and 41.

Example 9

Mixture 7-213-M3

| Chemical structure of components | Wt % | Mol % |
|---|---|---|
| C₇H₁₅–O–[phenyl]–C(=O)–CH₂–O–C(=O)–[cyclohexyl]–C₅H₁₁ | 32.8 | 31 |

| Chemical structure of components | Wt % | Mol % |
|---|---|---|
| 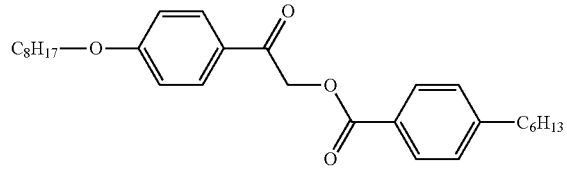 | 17.2 | 15.5 |
| 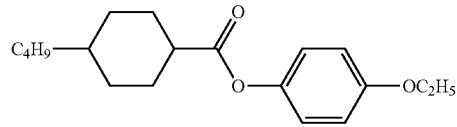 | 13.2 | 15.5 |
| 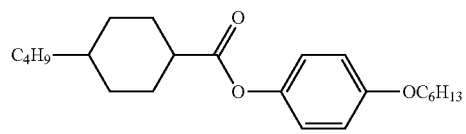 | 27.4 | 31 |
| 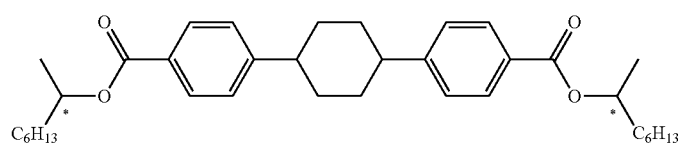 | 9.4 | 7.0 |
| Estimated Δn | 0.088 | |
| Phase transitions | Iso 86 SmA 61.0 SmC* 14 Cr | |
Example 10
Mixture 7-022-M6
| Chemical structure of components | Wt % |
|---|---|
| 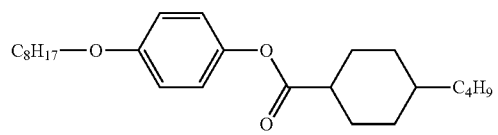 | 33.7 |
| 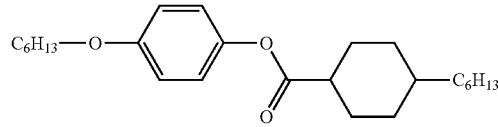 | 16.8 |
| 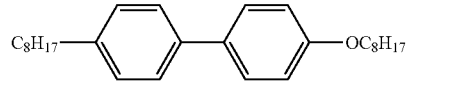 | 39.0 |
| 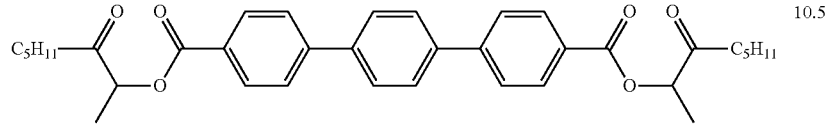 | 10.5 |
| Phase transitions | Iso 66 SmA 48 SmC* |
| Estimated Δn | 0.119 |
| θc at 21° C. | 15 |
| Ps, nC/cm$^2$, at 26° C. | 8.5 |

Example 11
Mixture 7-029-M2
| Chemical structure of components | Wt % |
|---|---|
| 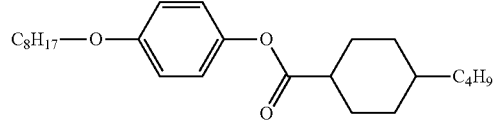 | 30.5 |
| 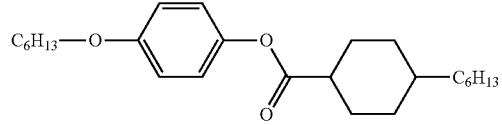 | 15.3 |
| 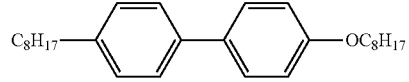 | 35.3 |
| 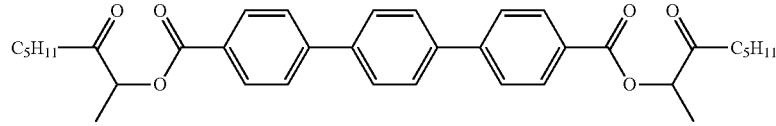 | 18.9 |
| Phase transitions | Iso 67 SmA 49 SmC* |
| Estimated Δn | 0.131 |
| Measured Δn | 0.100 |
| θc at 23° C. | 19.5 |
| Ps, nC/cm², at 23° C. | 92 |
Example 12
Mixture of PAC Homologues
| Chemical structure of components | Mol. % |
|---|---|
| 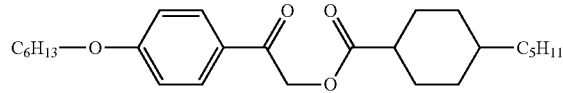 | 40 |
| 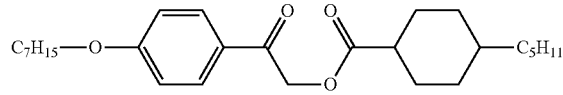 | 60 |
| Phase transitions | Iso 110.6 SmA 90.5 SmC (38.7 SmB) 49 Cr |
Example 13
Mixture of PAC-PC Compounds
| Chemical structure of components | Mol. % |
|---|---|
| 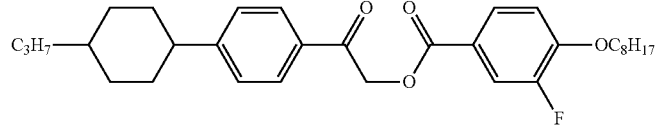 | 25 |

| Chemical structure of components | Mol. % |
|---|---|
| C₅H₁₁—[Cy]—[Ph]—C(O)—CH₂—O—C(O)—[Ph(2,3-F₂)]—OC₈H₁₇ | 37.5 |
| C₅H₁₁—[Cy]—[Ph]—C(O)—CH₂—O—C(O)—[Ph(2,3-F₂)]—OC₁₀H₂₁ | 37.5 |
| Phase transitions | Iso 165.5 N 144.2 SmA 139.8 SmC 35 Cr |

Example 14

| Chemical structure of components | Wt % |
|---|---|
| C₂H₅O—[Ph]—O—C(O)—[Cy]—C₄H₉ | 33.3 molar % |
| C₈H₁₇—O—[Ph]—C(O)—CH₂—O—C(O)—[Cy]—C₆H₁₃ | 33.3 molar % |
| C₈H₁₇—O—[Ph]—C(O)—CH₂—O—C(O)—[Ph]—C₇H₁₅ | 16.7 molar % |
| C₆H₁₃—CHF—CH₂—O—[Pyrimidine]—[Ph(3-F)]—OC₉H₁₉ | 16.7 molar % |
| Phase transitions | Iso 73 SmA 53 SmC* 19 Cr |
| Measured Δn | 0.1* |
| θc, degree, at 29° C. | 22 * |
| Ps, nC/cm², at 29° C. | 17.5* |
| $\square_{on}$, $\square$s, at 29° C. | 840* |

Figure 43:
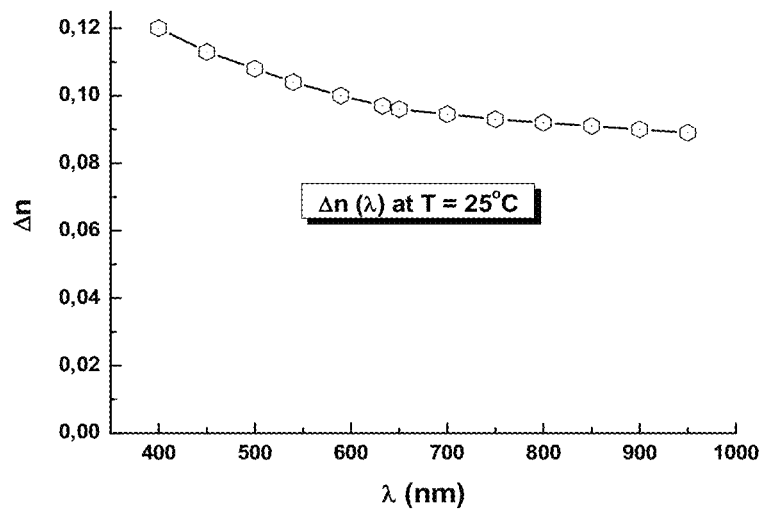
FIG. 43 shows a plot of the dispersion of birefringence at 25° C. for a FLC mixture according to Example 14, according to an embodiment of the invention.
Figure 44:
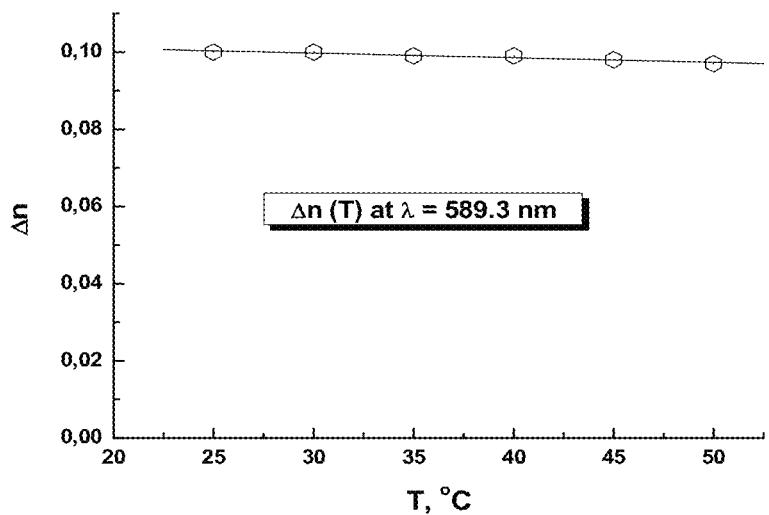
FIG. 44 shows plots of the temperature dependency on spontaneous polarization and response time at Electric field (E)=2 V/μm for a FLC mixture according to Example 14, according to an embodiment of the invention.
Figure 45:
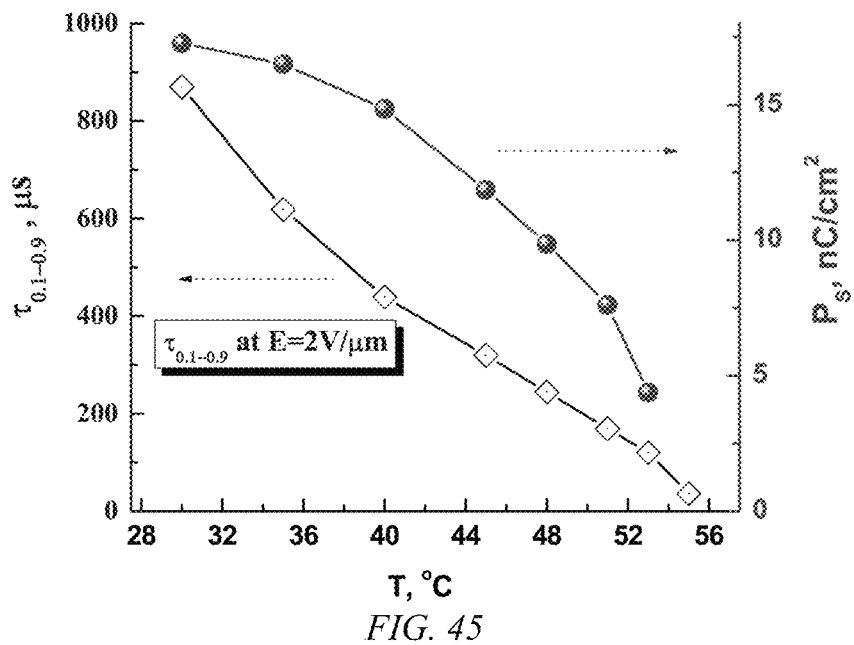
FIG. 45 shows plots of the temperature dependency on the tilt angle and response time for FLC mixture according to Example 14, according to an embodiment of the invention.

*)For temperature dependencies of these parameters are shown in FIGS. 43-45.

Example 15

Low-Δn FLC Mixture for DHF Effect, High Tilt

| Chemical structure of components | Mol. % |
|---|---|
| C₃H₇—[Cy]—[Ph]—C(O)—CH₂—O—C(O)—[Ph(3-F)]—OC₈H₁₇ | 12.4 |

Figure 46:
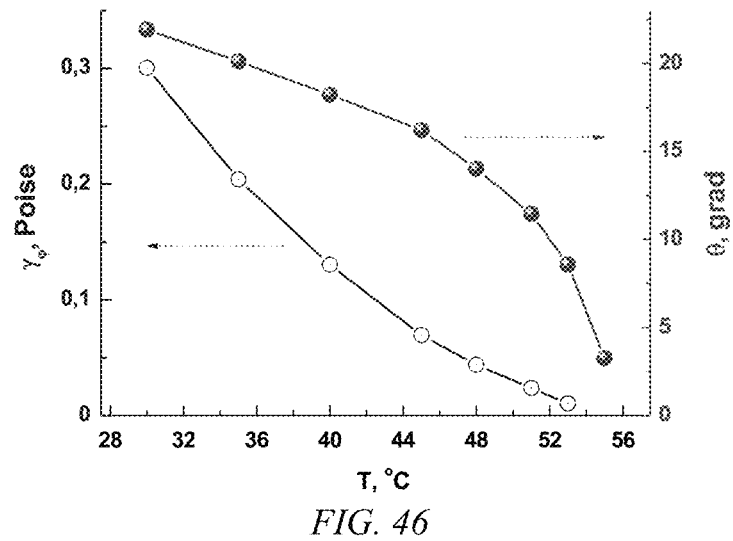
FIG. 46 shows plots of the temperature dependency on the tilt angle and rotational viscosity for FLC mixtures according to example 14, according to an embodiment of the invention.
Figure 47:
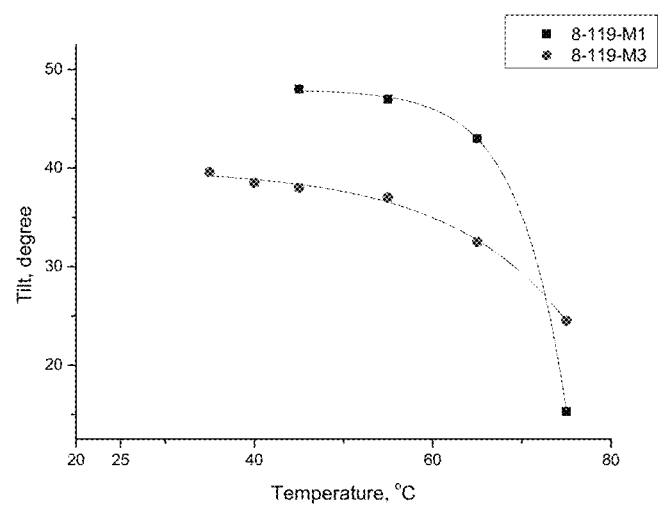
FIG. 47 shows plots of the temperature dependency on the tilt angles for FLC mixtures according to examples 15 and 16, according to an embodiment of the invention.

-continued
| Chemical structure of components | Mol. % |
|---|---|
| 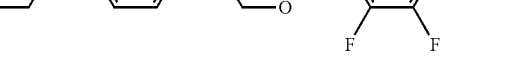 | 18.8 |
| 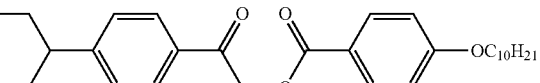 | 18.8 |
| 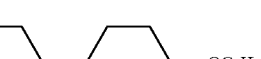 | 2.7 |
| 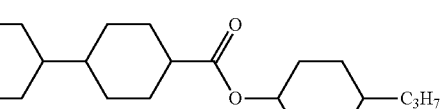 | 21.4 |
| 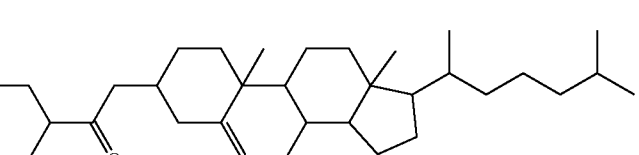 | 15.3 |
| 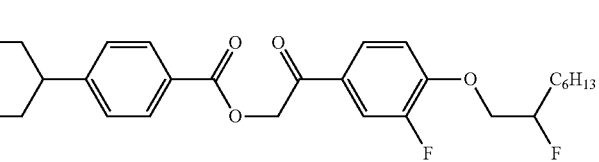 | 10.6 |
| Phase transitions | Iso 173.3 N* 140.2 SmA 78.8.0 SmC* 19 Cr |
| Estimated Δn | 0.09 |
| θc at 21° C.*) | 47 |
| ☐on, ☐s, at 21° C. | 6000 |
*) Temperature dependencies of these parameter are shown in FIG. 46.
Example 16
Low-Δn FLC Mixture for DHF Effect, High Tilt
| Chemical structure of components | Mol. % |
|---|---|
| | 16.1 |
| | 24.2 |

| Chemical structure of components | Mol. % |
|---|---|
| C₅H₁₁—[Cy]—[Ph]—C(O)CH₂—O—C(O)—[Ph(2,3-F₂)]—OC₁₀H₂₁ | 24.2 |
| C₃H₇—[Cy]—[Cy]—OC₂H₅ | 3.4 |
| C₃H₇—[Cy]—[Cy]—C(O)O—[Cy]—C₃H₇ | 11.9 |
| C₅H₁₁—[Cy]—C(O)CH₂—[cholesteryl] | 9.5 |
| C₃H₇—[Cy]—[Cy]—C(O)O—CH₂—C*H(F)—C₆H₁₃ | 10.7 |
| Phase transitions | Iso 173.3 N* 140.2 SmA 78.8.0 SmC* 19 Cr |
| Estimated Δn | 0.09 |
| θc at 21° C. *) | 47 |
| □ₒₙ, □s, at 21° C. | 9000 |

*) Temperature dependencies of these parameter are shown in FIGS. 46.

Example 17

Low-Δn FLC Mixture for DHF Effect

| Chemical structure of components | Mol. % |
|---|---|
| C₂H₅O—[Ph]—O—C(O)—[Cy]—C₄H₉ | 28.6 mol. % |
| C₈H₁₇—O—[Ph]—C(O)CH₂—O—C(O)—[Cy]—C₆H₁₃ | 28.6 mol. % |
| C₈H₁₇—O—[Ph]—C(O)CH₂—O—C(O)—[Ph]—C₇H₁₅ | 14.3 mol. % |
| C₆H₁₃—CH(F)—CH₂—O—[Pyrimidine]—[Ph]—O—CH₂—CH(F)—C₆H₁₃ | 14.2 mol. % |

-continued

| Chemical structure of components | Mol. % |
|---|---|
| 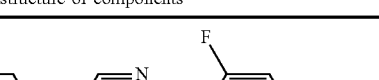 | 14.3 mol. % |
| Phase transitions | Iso 89 SmA 50.0 SmC* 18 Cr |
| Estimated Δn | 0.115 |
| Measured effective Δn, at 30° C.*⁾ | 0.093 |
| θc at 22° C.*⁾ | 21.5 |
| Ps, nC/cm², at 22° C.*⁾ | 38 |
| □$_{on}$, □s, at 22° C.*⁾ | 840 |

*⁾Temperature dependencies of these parameters are shown in FIGS. 34-37.

Example 18

Low-Δn FLC Mixture for DHF Effect 8-050-M6

| Chemical structure of components | Mol. % |
|---|---|
| 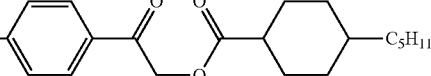 | 23 |
| 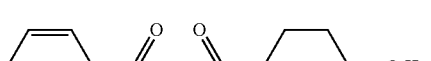 | 34 |
| 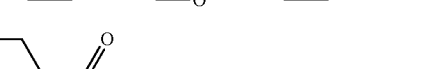 | 19 |
| 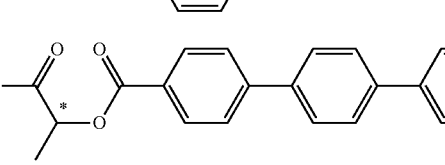 | 18 |
| Phase transitions | Iso 72 SmA 34.0 SmC* 14 Cr |
| Estimated Δn | 0.117 |
| Measured effective Δn, at 21° C. | 0.097 |
| θc at 21° C.*⁾ | 13.7 |
| □$_{on}$, □s, at 21° C.*⁾ | 80 |

Figure 38:
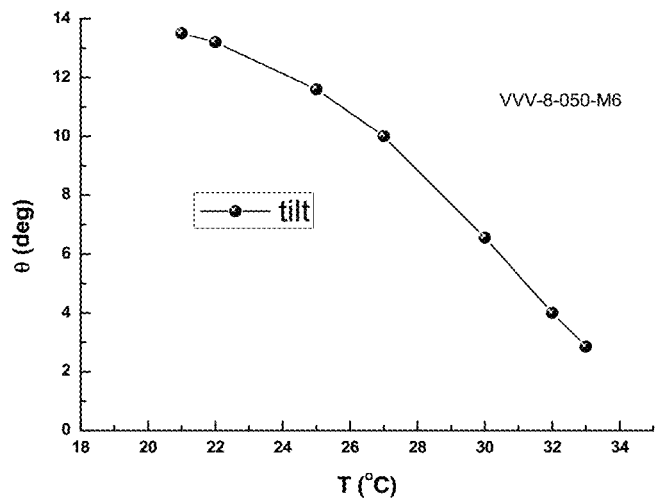
FIG. 38 shows a plot of the temperature dependence of tilt angle for FLC mixtures of Example 18, according to an embodiment of the invention.
Figure 39:
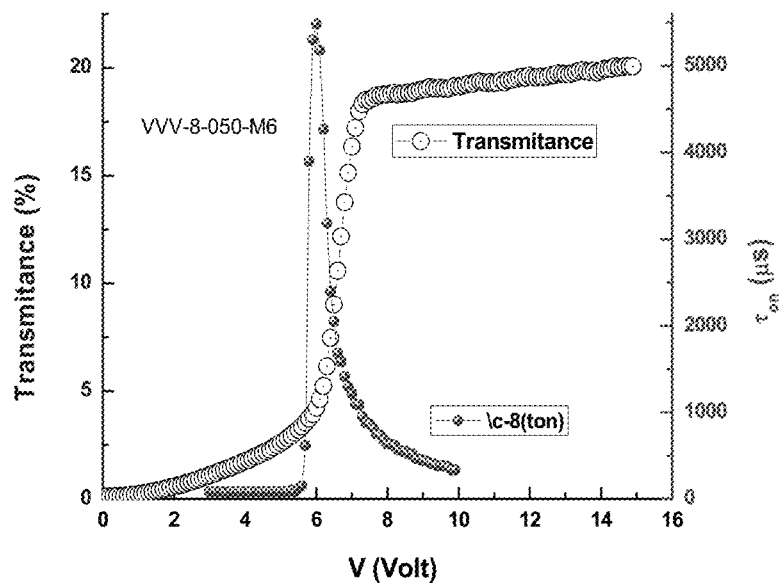
FIG. 39 shows plots illustrating the dependence of response time and transmittance of the cell vs applied voltage for FLC mixtures of Example 18, according to an embodiment of the invention.

*⁾Temperature dependencies of these parameters are shown in FIGS. 38-39.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A low birefringence ferroelectric liquid crystal (FLC) mixture having a birefringence value of 0.05 to 0.14, comprising at least one low birefringence component having a birefringence value of 0.02 to 0.1 of the formula:

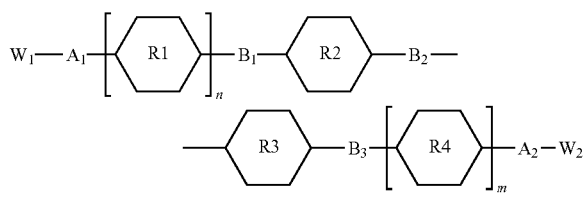

wherein:
   n and m are independently 0, 1 or 2;
   R1, R2, R3 and R4 are independently selected from an aromatic, hetero-aromatic, 1,4-cyclohexylidene, 1,4-cyclohexenylidene, 1,3-dioxolane, and a polycyclic aliphatic group, wherein one or more H atoms of the polycyclic aliphatic group may be replaced by a halogen;

when R1, R2, R3, or R4 groups are aromatic and heteroaromatic rings, they are not conjugated to one another, and each of such R1-R4 groups is in conjugation with no more than one double bond of type C=Z, where Z is C, N, or O;

$A_1$ and $A_2$ are independently a single C—C bond, O, S or an ester functional group;

$B_1$, $B_2$, and $B_3$ are independently either absent, thereby denoting a C—C single bond connection between two neighboring R groups, or selected from an ester functional group, —C(O)CH$_2$OC(O)—, —CX$_2$CH$_2$OC(O)—, —(CH$_2$)$_m$—, or —(OCH$_2$)$_m$— where X is H or halogen, and m is 2-11, —C(O)(CH$_2$)$_p$C(O)O—, —(CX$_2$)$_p$CH$_2$C(O)O— and —C(O)O(CH$_2$)$_p$C(O)O— where X is independently H or halogen and p is 2-11; and $W_1$ and $W_2$ are independently n-alkyl or n-alkenyl, chiral or achiral branched alkyl, chiral or achiral alkenyl, and optionally where one or more hydrogen is independently replaced by F and, optionally one or more CH$_2$ is independently replaced with CF$_2$, O, or CH=CH groups, provided that two O atoms are not linked together.

2. The low birefringence ferroelectric liquid crystal (FLC) mixture according to claim 1, wherein at least one of $W_1$ and $W_2$ is chiral.

3. The low birefringence ferroelectric liquid crystal (FLC) mixture according to claim 1, further comprising a thermotropic liquid crystal selected from nematic, cholesteric, smectic-A, smectic-B, and smectic-C, having a birefringence of 0.02 to 0.25.

4. The low birefringence ferroelectric liquid crystal (FLC) mixture according to claim 2, wherein the low birefringence component has the structure:

where $A_1$ and $A_2$ are each as defined in claim 1, and where $W_1$ and $W_2$ are each chiral.

5. The low birefringence ferroelectric liquid crystal (FLC) mixture according to claim 1, wherein the low birefringence component has the structure:

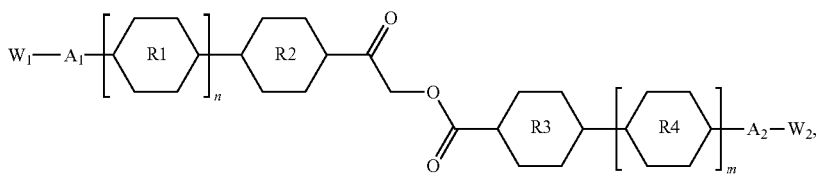

wherein:

m and n are independently 0 or 1;

R1 is selected from an 1,4-cyclohexylidene, 1,4-cyclohexenylidene or 1,3-dioxolane ring;

R2 is aromatic ring, optionally where H atoms in 2- or 3-positions are independently replaced with F atoms; and R3, R4, $A_1$, $A_2$, $W_1$, and $W_2$ are each as defined in claim 1.

6. The low birefringence ferroelectric liquid crystal (FLC) mixture according to claim 1, wherein the low birefringence component has the structure:

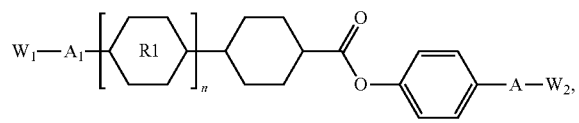

wherein:

n is 0 or 1; and

R1, $A_1$, $A_2$, $W_1$, and $W_2$ are each as defined in claim 1.

7. The low birefringence ferroelectric liquid crystal (FLC) mixture according to claim 1, wherein the second component has the structure:

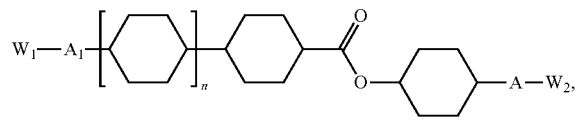

wherein n is 0 or 1;

$A_1$ and $A_2$ are independently a single C—C bond or O; and $W_1$ and $W_2$ are independently n-alkyl or n-alkenyl.

8. The low birefringence ferroelectric liquid crystal (FLC) mixture according to claim 1, further comprising a thermotropic liquid crystal of the structure:

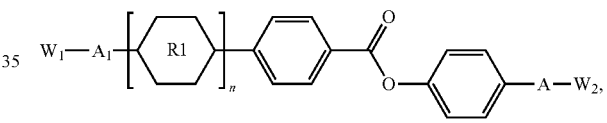

wherein:

n is 0 or 1;

R1 is selected from an 1,4-cyclohexylidene, 1,4-cyclohexenylidene, and 1,3-dioxolane group; and $A_1$, $A_2$, $W_1$, and $W_2$ are each as defined in claim 1.

9. The low birefringence ferroelectric liquid crystal (FLC) mixture according to claim 1, further comprising a thermotropic liquid crystal of the structure:

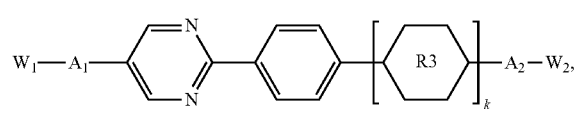

wherein:

k is 0 or 1; and

R3, $A_1$, $A_2$, $W_1$, and $W_2$ are each as defined in claim 1.

10. The low birefringence ferroelectric liquid crystal (FLC) mixture according to claim 2, further comprising a chiral component of the structure:

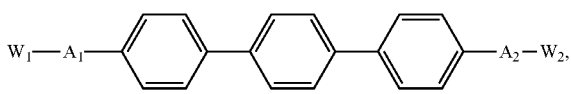

wherein:
A₁ and A₂ are each as defined in claim 1; and
W₁ and W₂ are each chiral.

11. The low birefringence ferroelectric liquid crystal (FLC) mixture according to claim 1, wherein the low birefringence component has the structure:

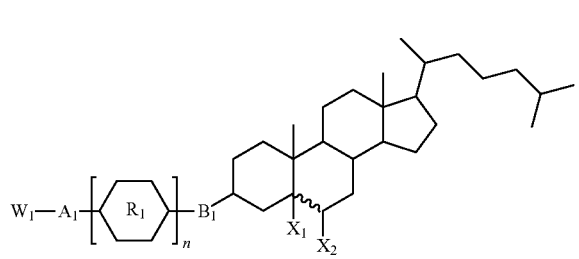

wherein:
n is 0, 1;
∿ is a carbon-carbon single bond or carbon-carbon double bond;
X₁ and X₂ are independently absent, H, F or Cl;
B₁ is O, OCO or O(CO)O functional group;
R1 is 1,4-phenylene or 1,4-cyclohexylidene;
A₁ is either absent, thereby denoting a C—C single bond, or O, and
W₁ is as defined in claim 1.

12. The low birefringence ferroelectric liquid crystal (FLC) mixture according to claim 1, wherein the low birefringence ferroelectric liquid crystal (FLC) mixture has a ferroelectric temperature range of more than 100° C.

13. The low birefringence ferroelectric liquid crystal (FLC) mixture according to claim 1, wherein the ferroelectric liquid crystal mixture displays a smectic-C tilt angle of 19° to 45° at −20° C. to 100° C.

14. The low birefringence ferroelectric liquid crystal (FLC) mixture according to claim 1, wherein the ferroelectric liquid crystal mixture displays a smectic-C tilt angle of 22.5° at −20° C. to 100° C.

15. The low birefringence ferroelectric liquid crystal (FLC) mixture according to claim 1, wherein the ferroelectric liquid crystal mixture displays a smectic-C tilt angle of 37° at −20° C. to 100° C.

16. The low birefringence ferroelectric liquid crystal (FLC) mixture according to claim 1, wherein the ferroelectric liquid crystal mixture comprises at least one chiral component and displays a helical pitch of 40 nm to 10 μm.

17. The low birefringence ferroelectric liquid crystal (FLC) mixture according to claim 1, wherein the thermotropic liquid crystal displays a smectic-C phase with a helical pitch of 300 nm or less.

18. The low birefringence ferroelectric liquid crystal mixture according to claim 1, wherein the said ferroelectric liquid crystal mixture has a helical pitch in a smectic-C phase of 0.7 μm or higher.

19. The low birefringence component according to claim 1, wherein polycyclic group is selected from:

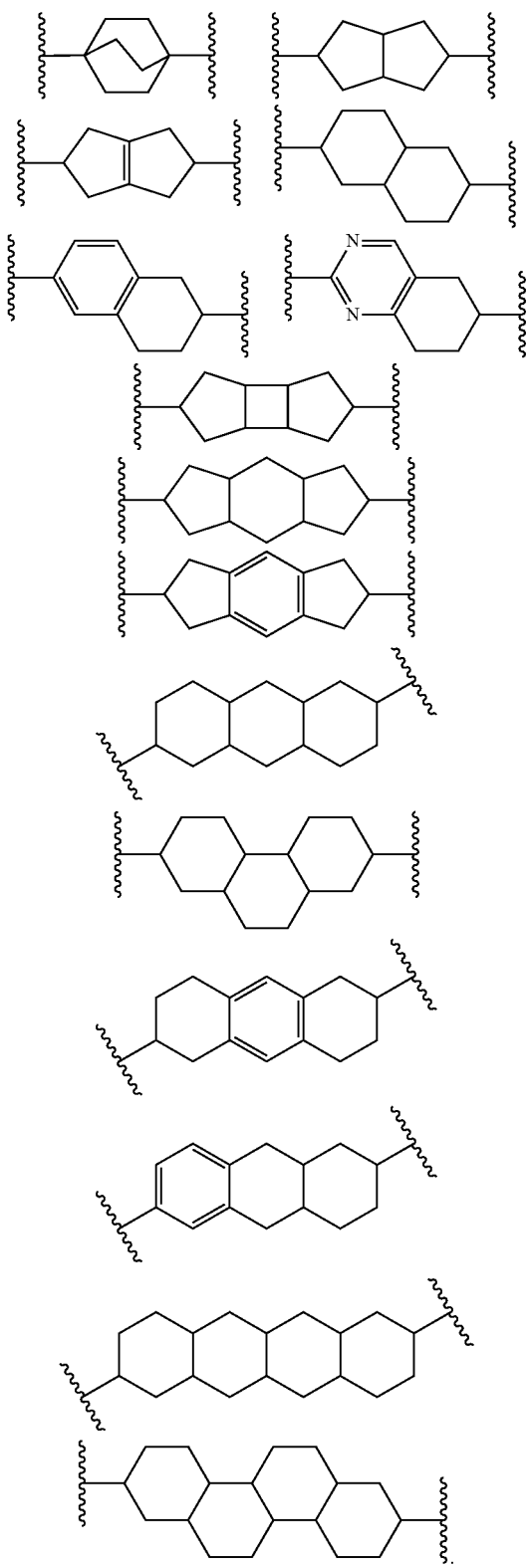

* * * * *